US011650220B2

(12) United States Patent
Tanaka

(10) Patent No.: US 11,650,220 B2
(45) Date of Patent: May 16, 2023

(54) PHYSICAL QUANTITY SENSOR, PHYSICAL QUANTITY SENSOR DEVICE, ELECTRONIC APPARATUS, PORTABLE ELECTRONIC APPARATUS, AND VEHICLE

(71) Applicant: Seiko Epson Corporation, Toyko (JP)

(72) Inventor: Satoru Tanaka, Chino (JP)

(73) Assignee: SEIKO EPSON CORPORATION

( * ) Notice: Subject to any disclaimer, the term of this patent is extended or adjusted under 35 U.S.C. 154(b) by 112 days.

(21) Appl. No.: 17/225,289

(22) Filed: Apr. 8, 2021

(65) Prior Publication Data

US 2021/0223283 A1 Jul. 22, 2021

Related U.S. Application Data

(62) Division of application No. 16/137,645, filed on Sep. 21, 2018, now Pat. No. 11,009,521.

(30) Foreign Application Priority Data

Sep. 22, 2017 (JP) ............................ JP2017-182170

(51) Int. Cl.
*G01P 15/08* (2006.01)
*G01P 3/44* (2006.01)
(Continued)

(52) U.S. Cl.
CPC ............ *G01P 15/0802* (2013.01); *G01P 3/44* (2013.01); *G01P 15/125* (2013.01); *G01P 15/18* (2013.01);
(Continued)

(58) Field of Classification Search
CPC ...... G01P 15/0802; G01P 3/44; G01P 15/125; G01P 15/18; G01C 19/5705
(Continued)

(56) References Cited

U.S. PATENT DOCUMENTS 5,025,346 A * 6/1991 Tang ........................ G03F 7/00
73/DIG. 1
6,223,598 B1 * 5/2001 Judy ...................... G01P 15/18
73/514.32
(Continued)

FOREIGN PATENT DOCUMENTS

| | | | |
|---|---|---|---|
| JP | 2000-512023 | A | 9/2000 |
| JP | 2015-503758 | A | 2/2015 |
| WO | 98-58265 | A1 | 12/1998 |

*Primary Examiner* — Alexander A Mercado
*Assistant Examiner* — Monica S Young
(74) *Attorney, Agent, or Firm* — Hamess, Dickey & Pierce, P.L.C.

(57) ABSTRACT

A physical quantity sensor includes a substrate, a pair of first elements detecting acceleration in a first direction, and a pair of second elements detecting an acceleration in a second direction. The first element portion includes a first movable portion displaceable in the first direction, first and second movable electrode fingers disposed in the first movable portion, first and second fixing electrode fingers disposed to face the first and second movable electrode fingers, and first and second support portions supporting the first and second fixing electrode fingers. The second element includes a second movable portion displaceable in the second direction, third and fourth movable electrode fingers disposed in the second movable portion, third and fourth fixing electrode fingers disposed to face the third and fourth movable electrode fingers, and third and fourth support portions supporting the third and fourth fixing electrode fingers.

4 Claims, 17 Drawing Sheets

(51) Int. Cl.
*G01P 15/18* (2013.01)
*G01P 15/125* (2006.01)
*G01C 19/5705* (2012.01)
*G01P 1/07* (2006.01)

(52) U.S. Cl.
CPC ............ *G01C 19/5705* (2013.01); *G01P 1/07* (2013.01); *G01P 2015/0814* (2013.01); *G01P 2015/0831* (2013.01); *G01P 2015/0871* (2013.01)

(58) Field of Classification Search
USPC .................................... 703/504.04; 73/504.04
See application file for complete search history.

(56) References Cited

U.S. PATENT DOCUMENTS

| | | | | |
|---|---|---|---|---|
| 10,168,350 | B2 * | 1/2019 | Tanaka | G01P 15/125 |
| 2004/0231420 | A1 | 11/2004 | Xie et al. | |
| 2005/0001275 | A1 * | 1/2005 | Sugiura | G01P 15/0802 257/414 |
| 2009/0314085 | A1 | 12/2009 | Stahl et al. | |
| 2010/0212423 | A1 | 8/2010 | Rehle | |
| 2011/0023606 | A1 | 2/2011 | Burghardt et al. | |
| 2012/0073370 | A1 * | 3/2012 | Schubert | G01P 15/125 73/504.12 |
| 2013/0192371 | A1 * | 8/2013 | Rytkonen | G01P 15/125 73/514.01 |
| 2013/0283913 | A1 | 10/2013 | Lin et al. | |
| 2013/0285172 | A1 * | 10/2013 | Jeong | G01P 15/125 257/415 |
| 2014/0236354 | A1 * | 8/2014 | Kamiya | G01L 1/144 700/258 |
| 2016/0041194 | A1 | 2/2016 | Rytkonen et al. | |
| 2016/0061858 | A1 * | 3/2016 | Tanaka | G01P 15/131 73/514.18 |
| 2016/0123802 | A1 | 5/2016 | Likovich et al. | |
| 2016/0146777 | A1 | 5/2016 | McKee | |
| 2016/0187371 | A1 | 6/2016 | Sakai et al. | |
| 2016/0377649 | A1 * | 12/2016 | Rytkönen | G01C 9/06 73/514.32 |
| 2017/0010295 | A1 | 1/2017 | Kigure et al. | |
| 2018/0188283 | A1 | 7/2018 | Mohammed et al. | |
| 2018/0291579 | A1 | 10/2018 | Gharabegian | |
| 2019/0094258 | A1 * | 3/2019 | Tanaka | G01P 15/18 |
| 2020/0096538 | A1 | 3/2020 | Zhang et al. | |
| 2020/0182903 | A1 * | 6/2020 | Tseng | G01P 15/125 |

* cited by examiner

PHYSICAL QUANTITY SENSOR, PHYSICAL QUANTITY SENSOR DEVICE, ELECTRONIC APPARATUS, PORTABLE ELECTRONIC APPARATUS, AND VEHICLE

CROSS-REFERENCE TO RELATED APPLICATIONS

This application is a divisional of U.S. patent application Ser. No. 16/137,645 filed on Sep. 21, 2018, which is based on, and claims priority under 35 U.S.C. § 119 to Japanese Patent Application No. 2017-182170, filed Sep. 22, 2017, the entire disclosures of which are expressly incorporated by reference herein.

BACKGROUND

1. Technical Field

According to an aspect of the present disclosure relates to a physical quantity sensor, a physical quantity sensor device, an electronic apparatus, a portable electronic apparatus, and a vehicle.

2. Related Art

For example, an acceleration sensor described in JP-T-2000-512023 is a biaxial acceleration sensor that can detect an acceleration in the X-axis direction and an acceleration in the Y-axis direction. The acceleration sensor includes a substrate, a movable portion that is displaceable in the X-axis direction and the Y-axis direction with respect to the substrate, a first X-axis movable electrode finger extending from the movable portion toward a plus side in the Y-axis direction, a second X-axis movable electrode finger extending from the movable portion toward a minus side in the Y-axis direction, a first Y-axis movable electrode finger extending from the movable portion toward the plus side in the X-axis direction, a second Y-axis movable electrode finger extending from the movable portion toward the minus side in the X-axis direction, a first X-axis fixing electrode finger facing the first X-axis movable electrode finger, a second X-axis fixing electrode finger facing the second X-axis movable electrode finger, a first Y-axis fixing electrode finger facing the first Y-axis movable electrode finger, a second Y-axis fixing electrode finger facing the second Y-axis movable electrode finger, a first X support portion that is bonded to the substrate and supports the first X-axis fixing electrode finger, a second X support portion that is bonded to the substrate and supports the second X-axis fixing electrode finger, a first Y support portion that is bonded to the substrate and supports the first Y-axis fixing electrode finger, and a second X support portion that is bonded to the substrate and supports the second Y-axis fixing electrode finger.

The acceleration sensor can detect an acceleration in the X-axis direction, based on a change in electrostatic capacitance between the first X-axis movable electrode finger and the first X-axis fixing electrode finger and a change in electrostatic capacitance between the second X-axis movable electrode finger and the second X-axis fixing electrode finger, and can detect an acceleration in the Y-axis direction, based on a change in electrostatic capacitance between the first Y-axis movable electrode finger and the first Y-axis fixing electrode finger and a change in electrostatic capacitance between the second Y-axis movable electrode finger and the second Y-axis fixing electrode finger.

However, in the acceleration sensor described in JP-T-2000-512023, the first X support portion and the second X support portion are located on a side opposite to the movable portion, and thereby, a separation distance therebetween is increased. Accordingly, influence of warpage (heat deflection) on the substrate is different by the first X support portion and the second X support portion, and a deviation occurs in the electrostatic capacitance between the first X-axis movable electrode finger and the first X-axis fixing electrode finger and in the electrostatic capacitance between the second X-axis movable electrode finger and the second X-axis fixing electrode finger due to temperature, and detection accuracy of the X-axis acceleration is reduced. This is the same for the Y-axis acceleration. In this way, the acceleration sensor described in JP-T-2000-512023 is susceptible to the influence of warpage on the substrate, and cannot exert favorable temperature characteristics.

SUMMARY

An advantage of some aspects of the invention is to provide a physical quantity sensor, a physical quantity sensor device, an electronic apparatus, a portable electronic apparatus, and a vehicle capable of exerting favorable temperature characteristics.

The invention can be implemented as the following configurations.

A physical quantity sensor according to an aspect of the invention includes a substrate, a pair of first elements that are disposed on the substrate and detect an acceleration in a first direction, and a pair of second elements that are disposed on the substrate and detect an acceleration in a second direction orthogonal to the first direction, in which each of the pair of first elements includes a first movable portion that is displaceable in the first direction with respect to the substrate, a first movable electrode finger and a second movable electrode finger that are disposed in the first movable portion, a first fixing electrode finger that is disposed on one side in the first direction with respect to the first movable electrode finger, a first support portion that is fixed to the substrate and supports the first fixing electrode finger, a second fixing electrode finger that is disposed on the other side in the first direction with respect to the second movable electrode finger, and a second support portion that is fixed to the substrate, is juxtaposed with the first support portion, and supports the second fixing electrode finger, and in which each of the pair of second elements includes a second movable portion that is displaceable in the second direction with respect to the substrate, a third movable electrode finger and a fourth movable electrode finger that are disposed in the second movable portion, a third fixing electrode finger that is disposed on one side in the second direction with respect to the third movable electrode finger, a third support portion that is fixed to the substrate and supports the third fixing electrode finger, a fourth fixing electrode finger that is disposed on the other side in the second direction with respect to the fourth movable electrode finger, and a fourth support portion that is fixed to the substrate, is juxtaposed with the third support portion, and supports the fourth fixing electrode finger.

With this configuration, it is possible to obtain a physical quantity sensor capable of reducing influence of heat deflection on a substrate and exerting favorable temperature characteristics.

In the physical quantity sensor according to the aspect of the invention, it is preferable that each of the pair of first elements includes a first fixing portion that is fixed to the substrate and a first spring that connects the first fixing portion to the first movable portion, the first movable portion is cantilever-supported to the first fixing portion via the first spring, each of the pair of second elements includes a second fixing portion that is fixed to the substrate and a second spring that connects the second fixing portion to the second movable portion, and the second movable portion is cantilever-supported to the second fixing portion via the second spring.

With this configuration, for example, it is possible to reduce a size of a physical quantity sensor, compared to a configuration in which a first movable portion and a second movable portion are supported at both ends.

In the physical quantity sensor according to the aspect of the invention, it is preferable that, if an angular velocity that is obtained by using a third direction orthogonal to the first direction and the second direction as an axis is applied, a separation distance between the first movable electrode finger and the first fixing electrode finger and a separation distance between the second movable electrode finger and the second fixing electrode finger are separated from or approach each other, in the pair of first elements, and a separation distance between the third movable electrode finger and the third fixing electrode finger and a separation distance between the fourth movable electrode finger and the fourth fixing electrode finger are separated from or approach each other, in the pair of second elements.

With this configuration, it is possible to reduce influence of an angular velocity.

In the physical quantity sensor according to the aspect of the invention, it is preferable that when a first virtual line in the first direction and a second virtual line orthogonal to the first virtual line in the second direction are set and when among four quadrants that are partitioned by the first virtual line and the second virtual line in a plan view, one set of quadrants facing an intersection point between the first virtual line and the second virtual line is referred to as a first quadrant and a second quadrant and the other set is referred to as a third quadrant and a fourth quadrant, one of the pair of first elements is disposed in the first quadrant and the other is disposed in the second quadrant, and one of the pair of second elements is disposed in the third quadrant and the other is disposed in the fourth quadrant.

With this configuration, it is possible to dispose a first element portion and a second element portion in a comparatively small space and to reduce a size of a physical quantity sensor.

In the physical quantity sensor according to the aspect of the invention, it is preferable that the pair of first elements are disposed point-symmetrically with respect to the intersection point, and the pair of second elements are disposed point-symmetrically with respect to the intersection point.

With this configuration, it is possible to dispose four elements of first and second elements in a well-balanced manner.

A physical quantity sensor device according to another aspect of the invention includes the physical quantity sensor according to the aspect of the invention and a circuit element.

With this configuration, it is possible to obtain effects of a physical quantity sensor according to the invention and to obtain a highly reliable physical quantity sensor device.

An electronic apparatus according to another aspect of the invention includes the physical quantity sensor according to the aspect of the invention, a control circuit, and a correction circuit.

With this configuration, it is possible to obtain effects of a physical quantity sensor according to the invention and to obtain a highly reliable electronic apparatus.

A portable electronic apparatus according to another aspect of the invention includes the physical quantity sensor according to the aspect of the invention, a case that stores the physical quantity sensor, a processing unit that is stored in the case and processes output data from the physical quantity sensor, a display unit that is stored in the case, and a light-transmitting cover that covers an opening of the case.

With this configuration, it is possible to obtain effects of a physical quantity sensor according to the invention and to obtain a highly reliable portable electronic apparatus.

A vehicle according to another aspect of the invention includes the physical quantity sensor according to the aspect of the invention and a posture control circuit.

With this configuration, it is possible to obtain effects of a physical quantity sensor according to the invention and to obtain a highly reliable vehicle.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a physical quantity sensor, a physical quantity sensor device, an electronic apparatus, a portable electronic apparatus, and a vehicle according to the invention will be described in detail based on embodiments illustrated in the accompanying drawings.

First Embodiment

A physical quantity sensor according to a first embodiment will be described.

Figure 1:
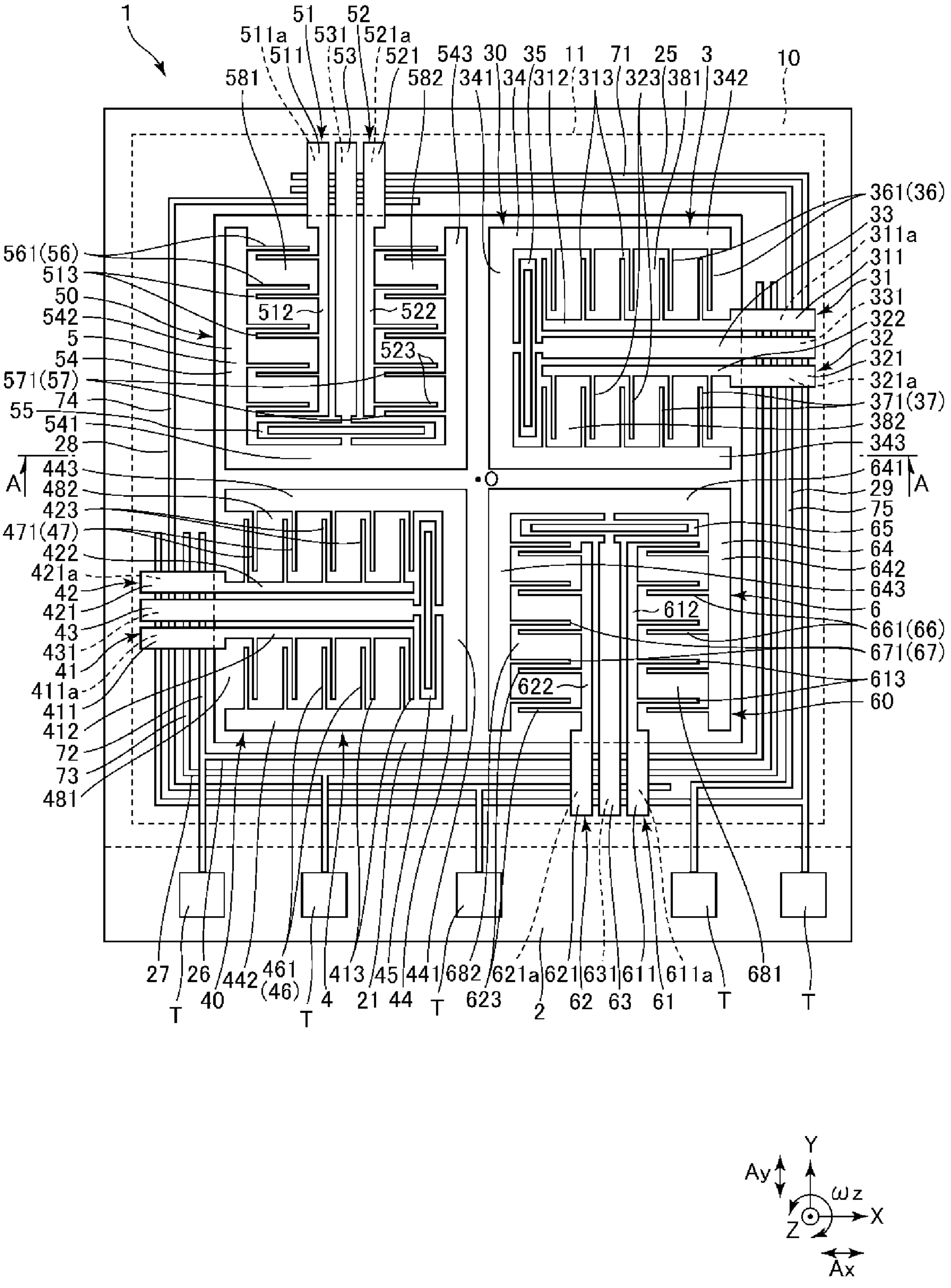
FIG. 1 is a plan view illustrating a physical quantity sensor according to a first embodiment.
Figure 2:
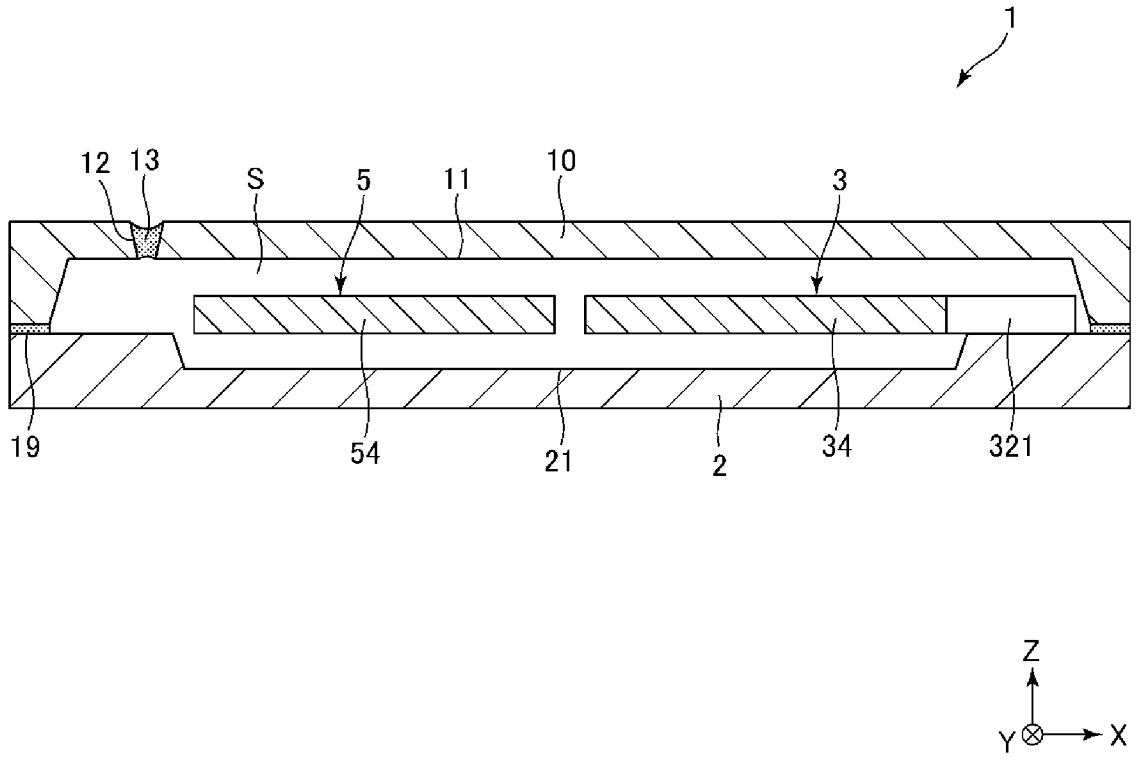
FIG. 2 is a cross-sectional view taken along line A-A in FIG. 1.
Figure 3:
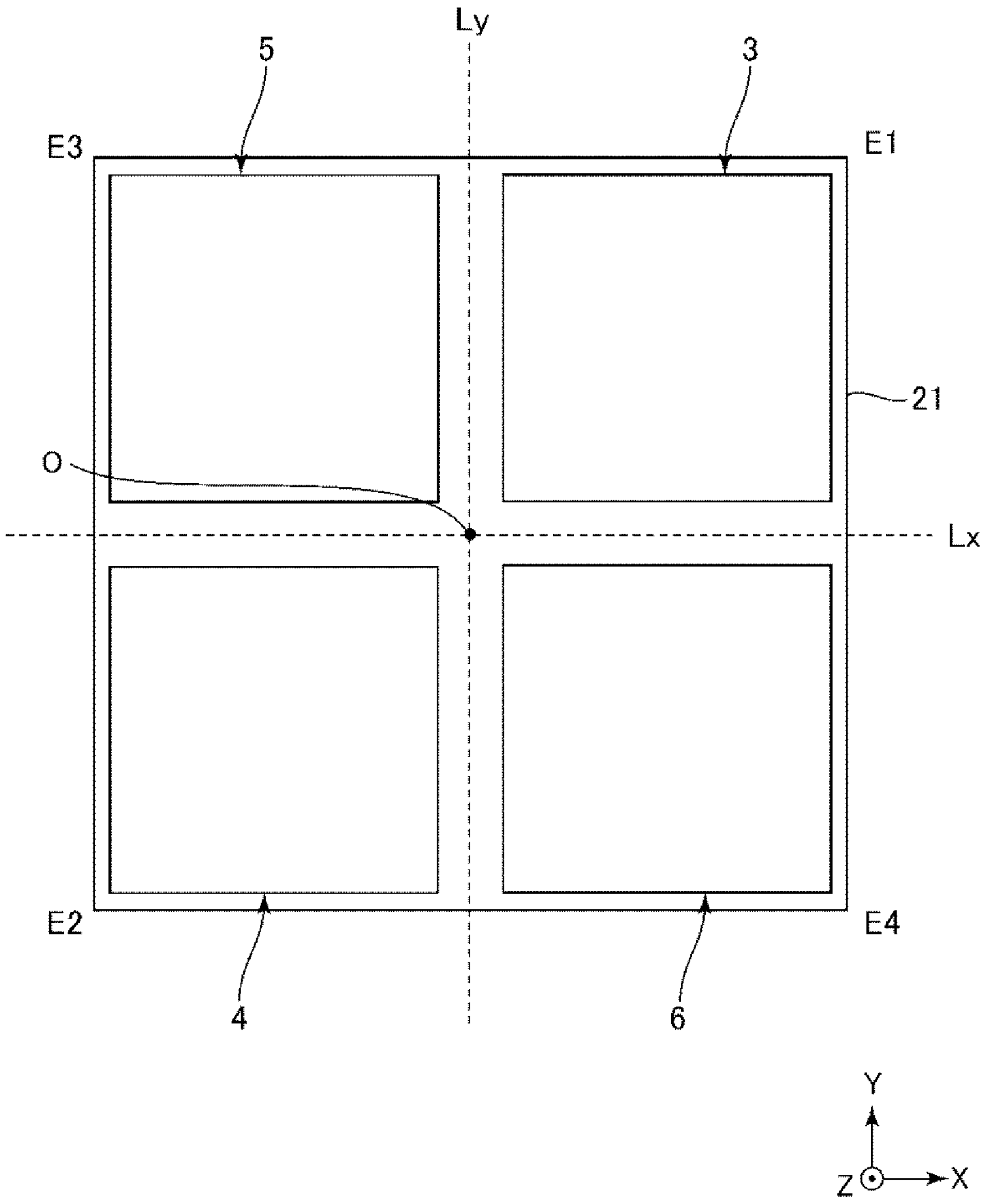
FIG. 3 is a plan view illustrating an arrangement of four elements.
Figure 4:
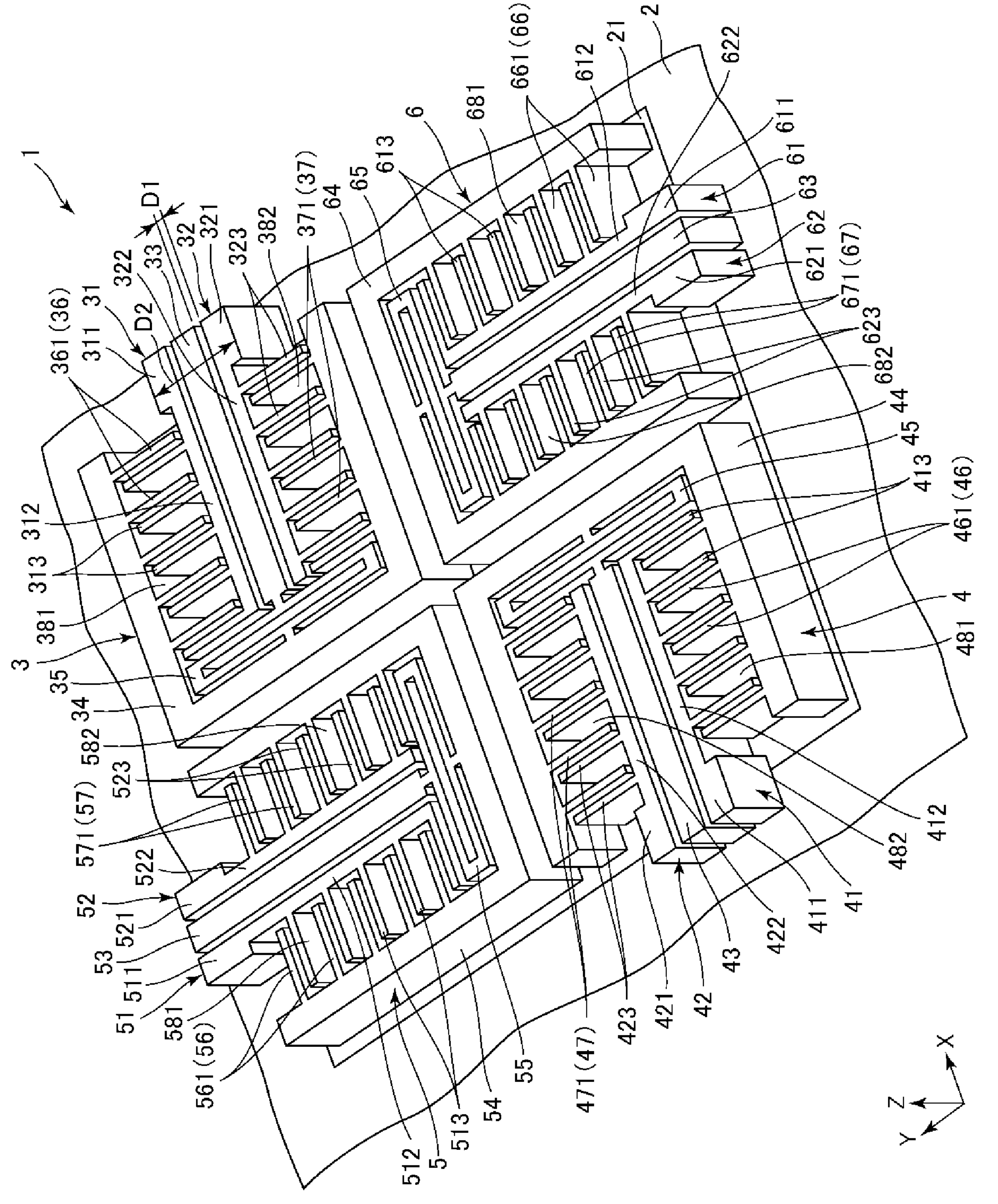
FIG. 4 is a perspective view illustrating the four elements.
Figure 5:
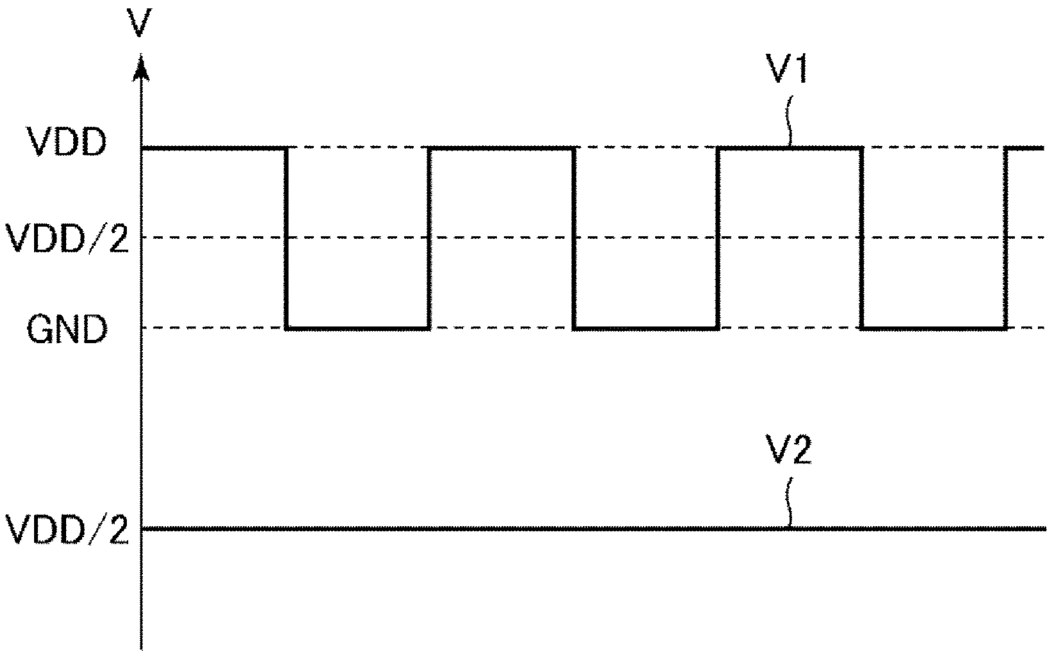
FIG. 5 is a diagram illustrating voltages applied to the physical quantity sensor illustrated in FIG. 1.
Figure 6:
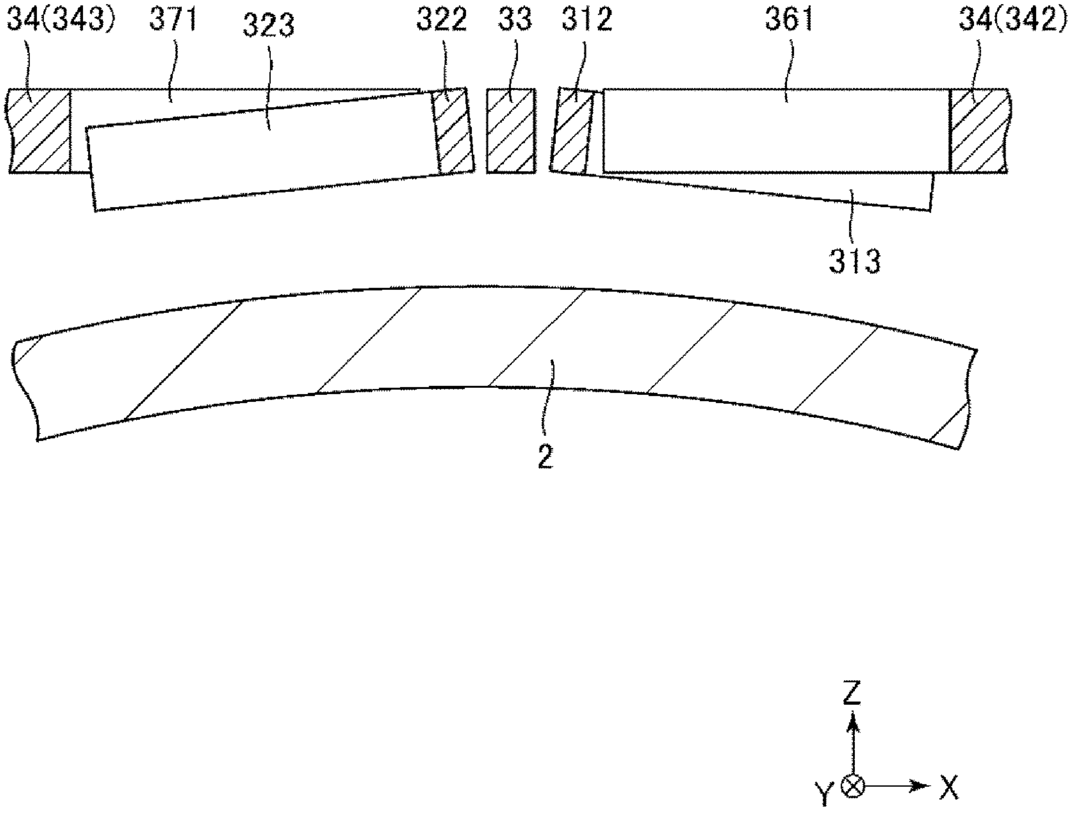
FIG. 6 is a cross-sectional view illustrating a state in which heat deflection occurs in a substrate.
Figure 7:
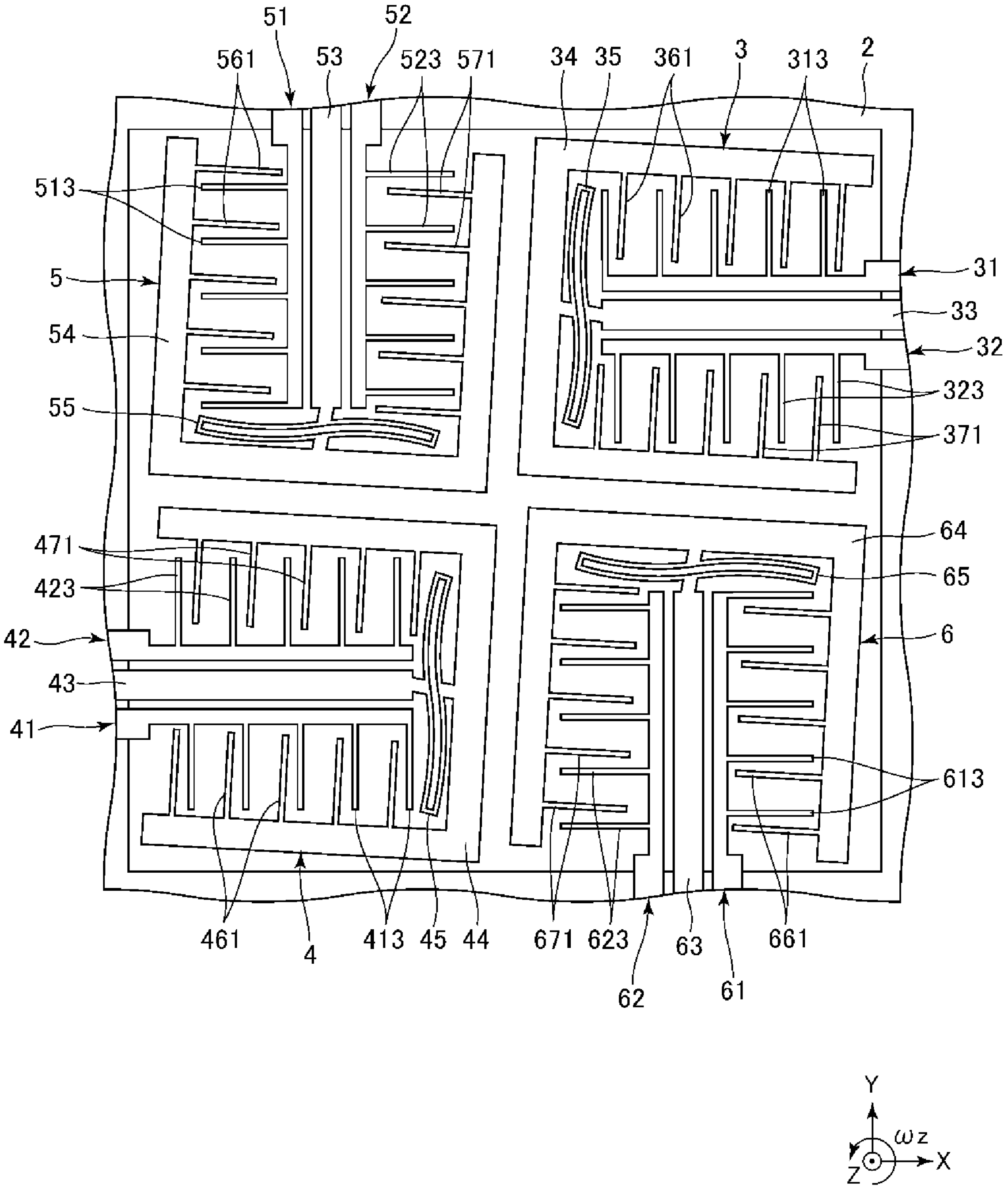
FIG. 7 is a plan view illustrating a state in which an angular velocity acts on the physical quantity sensor.
Figure 8:
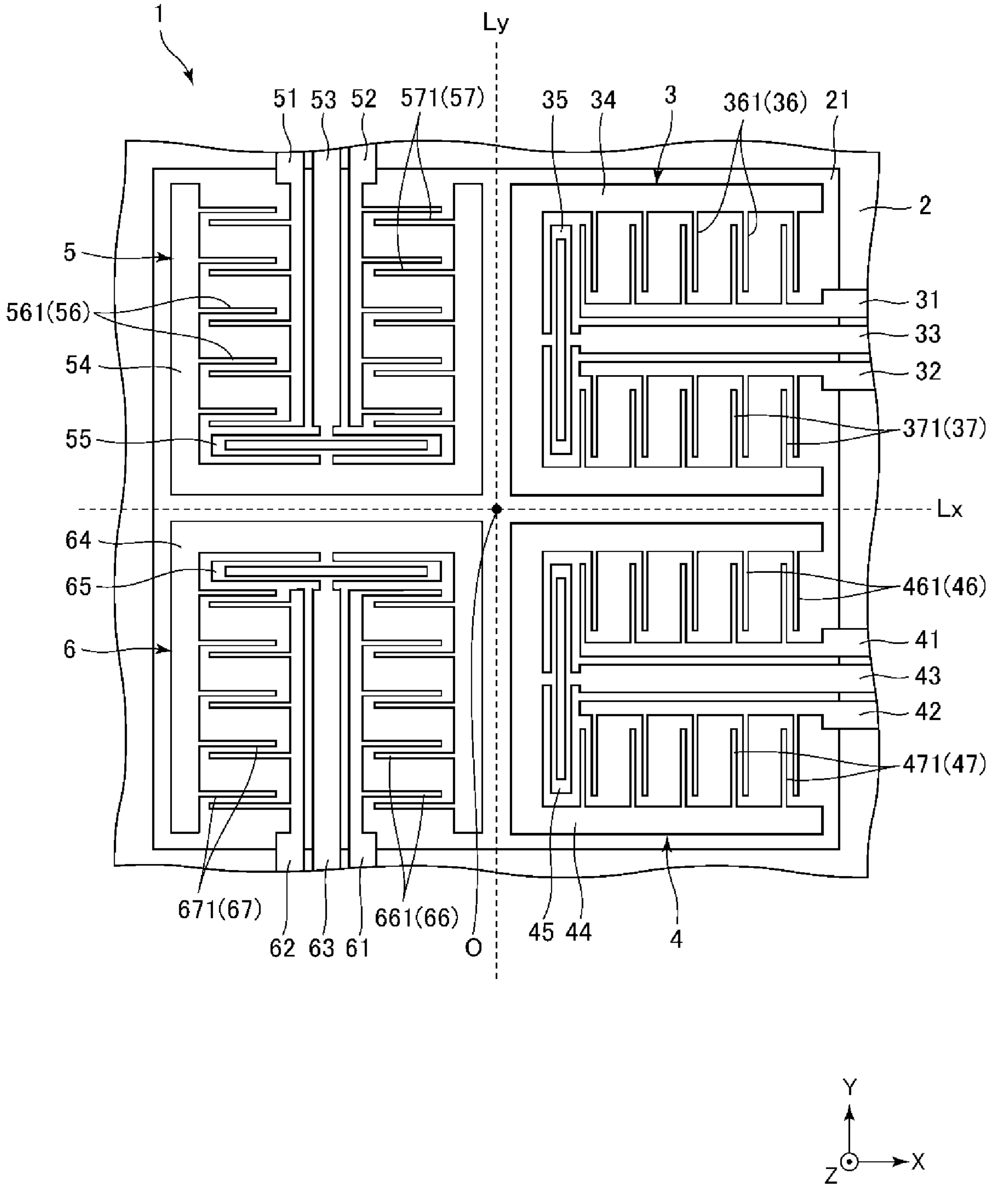
FIG. 8 is a plan view illustrating a modification example of the physical quantity sensor illustrated in FIG. 1.

FIG. 1 is a plan view illustrating a physical quantity sensor according to a first embodiment. FIG. 2 is a cross-sectional view taken along line A-A in FIG. 1. FIG. 3 is a plan view illustrating an arrangement of four elements. FIG. 4 is a perspective view illustrating the four elements. FIG. 5 is a diagram illustrating voltages applied to the physical quantity sensor illustrated in FIG. 1. FIG. 6 is a cross-sectional view illustrating a state in which heat deflection occurs in a substrate. FIG. 7 is a plan view illustrating a state in which an angular velocity acts on the physical quantity sensor. FIG. 8 is a plan view illustrating a modification example of the physical quantity sensor illustrated in FIG. 1. Hereinafter, for the sake of convenient description, a front side of a paper surface of FIG. 1 and an upper side of FIG. 2 are also referred to as "upper", and a rear side of the paper surface of FIG. 1 and a lower side of FIG. 2 are also referred to as "lower". In addition, as illustrated in each figure, three mutually orthogonal axes are also referred to as an X axis, a Y axis, and a Z axis, respectively, a direction parallel to the X axis is also referred to as an "X-axis direction", a direction parallel to the Y axis is also referred to as an "Y-axis direction", and a direction parallel to the Z axis is also referred to as a "Z-axis direction". In addition, a tip side of each axis in an arrow direction is also referred to as a "plus side", and an opposite side is also referred to as a "minus side".

In a specification of the present application, a term "orthogonal" includes not only a case of intersecting at 90° but also a case of intersecting at an angle (for example, 90°±5°) slightly inclined from 90°. Specifically, a case where the X axis is inclined by approximately ±5° with respect to a normal direction of an YZ plane, a case where the Y axis is inclined by approximately ±5° with respect to a normal direction of an XZ plane, and a case where the Z axis is inclined by approximately ±5° with respect to the normal direction of the XY plane are also included in the "orthogonal".

A physical quantity sensor 1 illustrated in FIG. 1 is a two-axis acceleration sensor capable of detecting an acceleration Ax in the X-axis direction and an acceleration Ay in the Y-axis direction. The physical quantity sensor 1 includes a substrate 2, elements 3, 4, 5 and 6 provided on the substrate 2, a lid 10 joined to the substrate 2 so as to cover the respective elements 3, 4, 5, and 6. Among the four elements 3, 4, 5, and 6, the elements 3 and 4 are elements for detecting the acceleration Ax, and the elements 5 and 6 are elements for detecting the acceleration Ay.

As illustrated in FIG. 1, the substrate 2 has a plate shape of a rectangular plan view shape. In addition, the substrate 2 has a recessed portion 21 formed on an upper surface thereof. In a plan view from the Z-axis direction, the recessed portion 21 is formed so as to include movable portions 34, 44, 54, 64 of the elements 3, 4, 5, 6 inside. The recessed portion 21 functions as a relief portion for preventing the movable portions 34, 44, 54, 64 from coming into contact with the substrate 2. The plan view shape of the substrate 2 is not limited in particular, and may be any shape such as a triangle, a quadrangle other than a rectangle, a polygon such as a pentagon, a circle, an ellipse, or an irregular shape.

In addition, the substrate 2 includes five grooves 25, 26, 27, 28, and 29 formed on the upper surface. One end of each of the grooves 25, 26, 27, 28, and 29 is located outside the lid 10.

A glass substrate formed of, for example, a glass material containing alkali metal ions (movable ions) (for example, Pyrex glass (registered trademark) or borosilicate glass such as Tempax glass (registered trademark)) can be used as the substrate 2 described above. Thereby, as will be described below, the element 3 and the substrate 2 can be bonded by anodic bonding and can be firmly bonded. In addition, since the substrate 2 having light transmittance is obtained, a state of the element 3 can be visually recognized from the outside of the physical quantity sensor 1 via the substrate 2.

However, the substrate 2 is not limited to the glass substrate, and for example, a silicon substrate or a ceramic substrate may be used. In a case where the silicon substrate is used, a high resistance silicon substrate is used from the viewpoint of preventing a short circuit, but it is preferable to use a silicon substrate having a silicon oxide film (insulating oxide) formed on a surface thereof by thermal oxidation or the like.

In addition, as illustrated in FIG. 1, wires 71, 72, 73, 74, and 75 are provided in the grooves 25, 26, 27, 28, and 29. In addition, one end of each of the wires 71, 72, 73, 74, and 75 is exposed to the outside of the lid 10, and function as a terminal T that is electrically connected to an external device. Portions at which the wires 71, 72, 73, 74, and 75 intersect are insulated.

A configuration material of the wires 71, 72, 73, 74, 75 is not limited in particular, and, for example, metal materials such as gold (Au), silver (Ag), platinum (Pt), palladium (Pd), iridium (Ir), copper (Cu), aluminum (Al), nickel (Ni), titanium (Ti), and tungsten (W), an alloy containing the metal materials, an oxide-based transparent conductive material such as indium tin oxide (ITO), indium zinc oxide (IZO), ZnO, or IGZO, or the like can be used as the wire, and one kind or a combination of two or more of these (for example, as a stacking body of two or more layers) can be used for the wire.

In addition, the lid 10 has a plate shape of a rectangular plan view shape. In addition, as illustrated in FIG. 2, the lid 10 includes a recessed portion 11 which opens on a lower surface side. In addition, the lid 10 is formed so as to store the elements 3, 4, 5, 6 in the recessed portion 11, and is bonded to the upper surface of the substrate 2. In FIG. 2, illustration of the grooves 25, 26, 27, 28, 29 and the wires 71, 72, 73, 74, 75 is omitted for the sake of convenient description. The lid 10 and the substrate 2 form a storage space S in which the elements 3, 4, 5, 6 are stored. However, the plan view shape of the lid 10 is not limited in particular, is determined according to the plan view shape of the substrate 2, and may be any shape such as a triangle, a quadrangle other than a rectangle, a polygon such as a pentagon, a circle, an ellipse, or an irregular shape.

As illustrated in FIG. 2, the lid 10 includes a communication hole 12 that communicates between the inside and the outside of the storage space S and can change the storage space S into a desirable atmosphere via the communication hole 12. In addition, a sealing 13 is disposed in the communication hole 12, and the communication hole 12 is sealed by the sealing 13.

The sealing 13 is not limited in particular as long as the sealing can seal the communication hole 12, and, for example, various alloys such as, a gold (Au)/tin (Sn)-based alloy, a gold (Au)/germanium (Ge)-based alloy, and a gold (Au)/Aluminum (Al)-based alloy, a glass material such as low melting point glass, and the like can be used as the sealing.

It is preferable that the storage space S stores an inert gas such as nitrogen, helium, or argon and is substantially at atmospheric pressure at an operating temperature (approximately −40° C. to 80° C.). By setting the storage space S to the atmospheric pressure, a viscous resistance increases, a damping effect is exerted, and vibration of the elements 3, 4, 5, and 6 can be promptly converged (stopped). Accordingly, detection accuracy of the accelerations Ax and Ay of the physical quantity sensor 1 is increased.

In the present embodiment, the lid 10 is configured with a silicon substrate. However, the lid 10 is not limited to the silicon substrate, and for example, a glass substrate or a ceramic substrate may be used therefor. In addition, a bonding method between the substrate 2 and the lid 10 is not limited in particular, and may be appropriately selected depending on materials of the substrate 2 and the lid 10, but, for example, anodic bonding, activation bonding for bonding junction surfaces activated by plasma irradiation, bonding made by a bonding material such as glass frit, diffusion bonding for bonding metal films formed on an upper surface of the substrate 2 and a lower surface of the lid 10, and the like may be used therefor.

In the present embodiment, as illustrated in FIG. 2, the substrate 2 and the lid 10 are bonded to each other via a glass frit 19 (low melting point glass) which is an example of a bonding material. In a state where the substrate 2 and the lid 10 are overlapped with each other, the inside and outside of the storage space S communicate with each other via the grooves 25, 26, 27, 28, and 29. Therefore, by using the glass frit 19, the substrate 2 and the lid 10 can be bonded to each other and the grooves 25, 26, 27, 28, and 29 can be sealed. Accordingly, airtight sealing of the storage space S becomes easy. In a case where the substrate 2 and the lid 10 are bonded to each other by anodic bonding or the like (that is, a bonding method that cannot seal the grooves 25, 26, 27, 28, and 29), the grooves 25, 26, 27, 28, and 29 can be closed by an $SiO_2$ film formed by a CVD method or the like that uses, for example, tetraethoxysilane (TEOS).

The elements 3, 4, 5, and 6 will be described. As described above, among the elements, the elements 3 and 4 are elements for detecting the acceleration Ax in the X-axis direction, and the elements 5 and 6 are elements for detecting the acceleration Ay in the Y-axis direction.

The elements 3, 4, 5, and 6 are formed by patterning a silicon substrate doped with impurities such as phosphorus (P) or boron (B) by etching (particularly dry etching). In addition, each of the elements 3, 4, 5, 6 is bonded to the substrate 2 by anodic bonding. However, materials of the elements 3, 4, 5, and 6 and a bonding method of the elements 3, 4, 5, and 6 to the substrate 2 are not limited in particular.

Here, as illustrated in FIG. 3, a first virtual line Lx in the X-axis direction and a second virtual line Ly intersecting the first virtual line Lx in the Y-axis direction are set. An intersection point O of the first virtual line Lx and the second virtual line Ly is located substantially at the center of the recessed portion 21 in a plan view from the Z-axis direction. Furthermore, among four quadrants partitioned by the first virtual line Lx and the second virtual line Ly, one set of quadrants facing the intersection point O is referred to as a first quadrant E1 (a region on a plus side in the X axis and a minus side in the Y axis) and a second quadrant E2 (a region on a minus side in the X axis and a minus side of Y axis) and the other set of quadrants is referred to as a third quadrant E3 (a region on the minus side in the X axis and the plus side in the Y axis) and a fourth quadrant E4 (a region on the plus side in the X-axis and the minus side in the Y-axis). In the present embodiment, the element 3 is disposed in the first quadrant E1, the element 4 is disposed in the second quadrant E2, the element 5 is disposed in the third quadrant E3, and the element 5 is disposed in the fourth quadrant E4. With the dispositions, the four elements 3, 4, 5, and 6 can be efficiently disposed at a smaller space. Accordingly, it is possible to reduce a size of the physical quantity sensor 1.

As illustrated in FIG. 1, the element 3 includes a first fixing electrode 31 and a second fixing electrode 32 which are fixed to the substrate 2, a fixing portion 33 fixed to the substrate 2, a movable portion 34 which is displaceable in the X-axis direction with respect to the fixing portion 33, a spring 35 connecting the fixing portion 33 to the movable portion 34, and a first movable electrode 36 and a second movable electrode 37 which are provided in the movable portion 34. Among those, the fixing portion 33, the movable portion 34, the spring 35, and the first and second movable electrodes 36 and 37 are integrally formed, and hereinafter, the aggregate will be referred to as a “movable body 30”.

The fixing portion 33 has an elongated shape extending in the X-axis direction and includes a bonding pad 331 bonded to an upper surface of the substrate 2 at an end on the plus side in the X-axis direction. The fixing portion 33 has a function of supporting the movable portion 34. In addition, the fixing portion 33 is located at a central portion of the element 3, and thereby, the movable portion 34 can be stably supported.

The movable portion 34 has a substantially “U” shape surrounding the fixing portion 33 from three sides in a plan view in the Z-axis direction. Specifically, the movable portion 34 includes a first extension portion 341 which is located on the minus side in the X-axis direction with respect to the fixing portion 33 and extends in the Y-axis direction, a second extension portion 342 which is located on the plus side in the Y-axis direction with respect to the fixing portion 33 and extends in the X-axis direction, and a third extension portion 343 which is located on the minus side in the Y-axis direction with respect to the fixing portion 33 and extends in the X-axis direction. As described above, it can also be said that the movable portion 34 has a frame shape having an opening on the plus side in the X-axis direction. By making the movable portion 34 have such a shape, it is possible to increase a mass of the movable portion 34. Accordingly, sensitivity is increased, and the acceleration Ax can be detected accurately.

In addition, a gap 381 for disposing the first fixing electrode 31 and the first movable electrode 36 is formed between the second extension portion 342 and the fixing portion 33, and a gap 382 for disposing the second fixing electrode 32 and the second movable electrode 37 is formed between the third extension portion 343 and the fixing portion 33.

In addition, the spring 35 is elastically deformable in the X-axis direction, and as the movable portion 34 is elastically deformed, the movable portion 34 can be displaced in the X-axis direction with respect to the fixing portion 33. The spring 35 connects an end of the fixing portion 33 on the minus side in the X-axis direction to the first extension portion 341 of the movable portion 34. Accordingly, the movable portion 34 is cantilever-supported (supported on only one side with respect to the center of the movable portion 34) to the fixing portion 33 via the spring 35. By cantilever-supporting the movable portion 34, a size of the element 3 can be reduced, for example, compared with a case where the movable portion 34 is supported at both ends by a pair of springs 35.

The first fixing electrode 31 includes a fixing portion 311 fixed to the substrate 2, a trunk 312 extending to the minus side in the X-axis direction from the fixing portion 311, and a plurality of fixing electrode fingers 313 extending to the plus side in the Y-axis direction from the trunk 312. Among those, each of the trunks 312 and the fixing electrode fingers 313 is located in a gap 381. In addition, the fixing portion 311 is located on the plus side in the Y-axis direction with respect to the fixing portion 33, and is juxtaposed with the fixing portion 33. In addition, the fixing portion 311 includes a bonding pad 311*a* bonded to the substrate 2. In addition, the plurality of fixing electrode fingers 313 are arranged side by side in the X-axis direction at approximately equal intervals.

Likewise, the second fixing electrode 32 includes a fixing portion 321 fixed to the substrate 2, a trunk 322 extending to the minus side in the X-axis direction from the fixing portion 321, and a plurality of fixing electrode fingers 323 extending in the Y-axis direction of the Y-axis direction from the trunk 322. Among those, each of the trunk 322 and the fixing electrode fingers 323 is located in a gap 382. In addition, the fixing portion 321 is located on the minus side in the Y-axis direction with respect to the fixing portion 33 and is juxtaposed with the fixing portion 33. In addition, the fixing portion 321 includes a bonding pad 321*a* bonded to the substrate 2. In addition, the plurality of fixing electrode fingers 323 are arranged side by side in the X-axis direction at approximately equal intervals.

The first movable electrode 36 includes a plurality of movable electrode fingers 361 which are arranged in the gap 381 and arranged side by side in the X-axis direction. In addition, the plurality of movable electrode fingers 361 respectively extend from the second extension portion 342 toward the minus side in the Y-axis direction, and are located on the plus side in the X-axis direction with respect to the corresponding fixing electrode finger 313, and face each other. As will be described below, while the physical quantity sensor 1 is driven, an electrostatic capacitance is formed between the movable electrode finger 361 and the fixing electrode finger 313 which form a pair.

Likewise, the second movable electrode 37 includes a plurality of movable electrode fingers 371 which are located in the gap 382 and are arranged side by side in the X-axis direction. In addition, the plurality of movable electrode fingers 371 respectively extend from the third extension portion 343 toward the plus side in the Y-axis direction, are located on the minus side in the X-axis direction with respect to the corresponding fixing electrode finger 323, and face each other. As will be described below, while the physical quantity sensor 1 is driven, an electrostatic capacitance is formed between the movable electrode finger 371 and the fixing electrode finger 323 that form a pair.

The element 4 has the same configuration as the element 3 described above and is disposed on the substrate 2 in a state of being rotated by 180° around the intersection point O with respect to the element 3. That is, the element 4 is provided point-symmetrically with the element 3 with respect to the intersection point O.

The element 4 includes a first fixing electrode 41 and a second fixing electrode 42 which are fixed to the substrate 2, a fixing portion 43 fixed to the substrate 2, a movable portion 44 that is displaceable in the X-axis direction with respect to the fixing portion 43, a spring 45 connecting the fixing portion 43 to the movable portion 44, and a first movable electrode 46 and a second movable electrode 47 which are provided in the movable portion 44. Among those, the fixing portion 43, the movable portion 44, the spring 45, and the first and second movable electrodes 46, 47 are integrally formed, and hereinafter, the aggregate will be also referred to as a "movable body 40".

Since the element 4 has the same configuration as the element 3, the element 4 will be briefly described hereinafter (for the detailed configuration, refer to the description on the element 3).

The fixing portion 43 has an elongated shape extending in the X-axis direction and includes a bonding pad 431 with the substrate 2 at an end on the minus side in the X-axis direction. The movable portion 44 has a substantially "U" shape surrounding the fixing portion 33 from three sides in a plan view in the Z-axis direction, and includes a first extension portion 441, a second extension portion 442, and a third extension portion 443. In addition, a gap 481 for disposing the first fixing electrode 41 and the first movable electrode 46 is formed between the second extension portion 442 and the fixing portion 43, and a gap 482 for disposing the second fixing electrode 42 and the second movable electrode 47 is formed between the third extension portion 443 and the fixing portion 43.

The spring 45 connects an end of the fixing portion 43 on the plus side in the X-axis direction to the first extension portion 441 of the movable portion 44. Accordingly, the movable portion 44 is cantilever-supported by the fixing portion 43 via the spring 45.

The first fixing electrode 41 includes a fixing portion 411 including a bonding pad 411*a* with the substrate 2, a trunk 412 extending from the fixing portion 411 toward the plus side in the X-axis direction, and a plurality of fixing electrode fingers 413 extending from the trunk 412 toward the minus side in the Y-axis direction. In addition, the second fixing electrode 42 includes a fixing portion 421 including a bonding pad 421*a* with the substrate 2, a trunk 422 extending from the fixing portion 421 toward the plus side in the X-axis direction, and a plurality of fixing electrode fingers 423 extending from the trunk 422 on the plus side in the Y-axis direction.

The first movable electrode 46 includes a plurality of movable electrode fingers 461 which are located in the gap 481 and are arranged side by side in the X-axis direction. The plurality of movable electrode fingers 461 extend from the second extension portion 442 toward the plus side in the Y-axis direction, are each located on the minus side in the X-axis direction with respect to the corresponding fixing electrode finger 413, and face each other. In addition, the second movable electrode 47 includes a plurality of movable electrode fingers 471 which are located in the gap 482 and are arranged side by side in the X-axis direction. The plurality of movable electrode fingers 471 extend from the third extension portion 443 toward the minus side in the Y-axis direction, are respectively located on the plus side in the X-axis direction with respect to the corresponding fixing electrode fingers 423, and face each other.

The element 5 has the same configuration as the above-described element 3, and is disposed on the substrate 2 in a state of being rotated by 90° counterclockwise in FIG. 1 around the intersection point O with respect to the element 3. That is, the element 5 is provided rotation-symmetrically with respect to the element 3 with respect to the intersection point O.

The element 5 includes a first fixing electrode 51 and a second fixing electrode 52 which are fixed to the substrate 2, a fixing portion 53 fixed to the substrate 2, a movable portion 54 displaceable in the Y-axis direction with respect to the fixing portion 53, a spring 55 connecting the fixing portion 53 to the movable portion 54, and a first movable electrode 56 and a second movable electrode 57 which are provided in the movable portion 54. Among those, the fixing portion 53, the movable portion 54, the spring 55, and the first and second movable electrodes 56 and 57 are integrally formed, and hereinafter, the aggregate is also referred to as a "movable body 50".

Since the element 5 has the same configuration as the element 3, the element 5 will be briefly described below (for the detailed configuration, refer to the description on the element 3).

The fixing portion 53 has an elongated shape extending in the Y-axis direction and includes a bonding pad 531 with the substrate 2 at an end on the plus side in the Y-axis direction. The movable portion 54 has a substantially "U" shape surrounding the fixing portion 53 from three sides in a plan view in the Z-axis direction, and includes a first extension portion 541, a second extension portion 542, and a third extension portion 543. In addition, a gap 581 for disposing the first fixing electrode 51 and the first movable electrode 56 is formed between the second extension portion 542 and the fixing portion 53, and a gap 582 for disposing the second fixing electrode 52 and the second movable electrode 57 is formed between the third extension portion 543 and the fixing portion 53.

The spring 55 connects an end of the fixing portion 53 on the minus side in the Y-axis direction to the first extension portion 541 of the movable portion 54. Accordingly, the movable portion 54 is cantilever-supported by the fixing portion 53 via the spring 55.

The first fixing electrode 51 includes a fixing portion 511 including a bonding pad 511*a* with the substrate 2, a trunk 512 extending from the fixing portion 511 toward the minus side in the Y-axis direction, and a plurality of fixing electrode fingers 513 extending from the trunk 512 toward the minus side in the X-axis direction. In addition, the second fixing electrode 52 includes a fixing portion 521 including a bonding pad 521*a* with the substrate 2, a trunk 522 extending from the fixing portion 521 toward the minus side in the Y-axis direction, and a plurality of fixing electrode fingers 523 extending from the trunk 522 toward the plus side in the X-axis direction.

The first movable electrode 56 includes a plurality of movable electrode fingers 561 which are located in the gap 581 and are arranged side by side in the Y-axis direction. The plurality of movable electrode fingers 561 extend from the second extension portion 542 toward the plus side in the X-axis direction, are respectively located on the plus side in the Y-axis direction with respect to the corresponding fixing electrode finger 513, and face each other. In addition, the second movable electrode 57 includes a plurality of movable electrode fingers 571 which are located in the gap 582 and are arranged side by side in the Y-axis direction. The plurality of movable electrode fingers 571 extend from the third extension portion 543 toward the minus side in the X-axis direction, are respectively located on the minus side in the Y-axis direction with respect to the corresponding fixing electrode finger 523, and face each other.

The element 6 has the same configuration as the above-described element 3, and is disposed in the substrate 2 in a state of being rotated by 90° clockwise in FIG. 1 around the intersection point O with respect to the element 3 described above. That is, the element 6 is provided rotation-symmetrically with respect to the element 3 with respect to the intersection point O.

The element 6 includes a first fixing electrode 61 and a second fixing electrode 62 which are fixed to the substrate 2, a fixing portion 63 fixed to the substrate 2, a movable portion 64 which is displaceable in the Y-axis direction with respect to the fixing portion 63, a spring 65 connecting the fixing portion 63 to the movable portion 64, and a first movable electrode 66 and a second movable electrode 67 which are provided in the movable portion 64. Among those, the fixing portion 63, the movable portion 64, the spring 65, and the first and second movable electrodes 66 and 67 are integrally formed, and hereinafter, the aggregate will be also referred to as a "movable body 60".

Since the element 6 has the same configuration as the element 3, the element 6 will be briefly described below (for a detailed configuration, refer to the description on the element 3).

The fixing portion 63 has an elongated shape extending in the Y-axis direction and includes a bonding pad 631 with the substrate 2 at an end on the minus side in the Y-axis direction. The movable portion 64 has a substantially "U" shape surrounding the fixing portion 63 from three sides in a plan view in the Z-axis direction, and includes a first extension portion 641, a second extension portion 642, and a third extension portion 643. In addition, a gap 681 for disposing the first fixing electrode 61 and the first movable electrode 66 is formed between the second extension portion 642 and the fixing portion 63, and a gap 682 for disposing the second fixing electrode 62 and the second movable electrode 67 is formed between the third extension portion 643 and the fixing portion 63.

The spring 65 connects an end of the fixing portion 63 on the plus side in the Y-axis direction to the first extension portion 641 of the movable portion 64. Accordingly, the movable portion 64 is cantilever-supported by the fixing portion 63 via the spring 65.

The first fixing electrode 61 includes a fixing portion 611 including a bonding pad 611*a* with the substrate 2, a trunk 612 extending from the fixing portion 611 toward the plus side in the Y-axis direction, and a plurality of fixing electrode fingers 613 extending from the trunk 612 toward the plus side in the X-axis direction. In addition, the second fixing electrode 62 includes a fixing portion 621 including a bonding pad 621*a* with the substrate 2, a trunk 622 extending from the fixing portion 621 toward the plus side in the Y-axis direction, and a plurality of fixing electrode fingers 623 extending from the trunk 622 toward the minus side in the X-axis direction.

The first movable electrode 66 includes a plurality of movable electrode fingers 661 which are located in the gap 681 and are arranged side by side in the Y-axis direction. The plurality of movable electrode fingers 661 extend from the second extension portion 642 toward the minus side in the X-axis direction, are respectively located on the minus side in the Y-axis direction with respect to the corresponding fixing electrode finger 613, and face each other. In addition, the second movable electrode 67 includes a plurality of movable electrode fingers 671 which are located in the gap 682 and are arranged side by side in the Y-axis direction. The plurality of movable electrode fingers 671 extends from the third extension portion 643 toward the plus side in the X-axis direction, are respectively located on the plus side in the Y-axis direction with respect to the corresponding fixing electrode finger 623, and face each other.

As described above, the elements 3, 4, 5, and 6 are described. Among the elements 3, 4, 5, and 6, the movable bodies 30, 40, 50, and 60 are electrically connected to the wire 71 via the fixing portions 33, 43, 53, and 63, respectively. In addition, the first fixing electrode 31 and the second fixing electrode 42 are electrically connected to the wire 72 via the fixing portions 311 and 421, respectively. In addition, the second fixing electrode 32 and the first fixing electrode 41 are electrically connected to the wire 73 via the fixing portions 321 and 411, respectively. In addition, the first fixing electrode 51 and the second fixing electrode 62 are electrically connected to the wire 74 via the fixing portions 511 and 621, respectively. In addition, the second fixing electrode 52 and the first fixing electrode 61 are electrically connected to the wire 75 via the fixing portions 521 and 611, respectively.

In addition, when the physical quantity sensor 1 is in operation, for example, a voltage V1 of FIG. 5 is applied to the wire 71 and a voltage V2 of FIG. 5 is applied to the wires 72, 73, 74, and 75. Accordingly, in the element 3, an electrostatic capacitance C31 is formed between the movable electrode finger 361 and the fixing electrode finger 313 which form a pair, and an electrostatic capacitance C32 is formed between the movable electrode finger 371 and the fixing electrode finger 323 which form a pair. In addition, in the element 4, an electrostatic capacitance C41 is formed between the movable electrode finger 461 and the fixing electrode finger 413 which form a pair, and an electrostatic capacitance C42 is formed between the movable electrode finger 471 and the fixing electrode finger 423 which form a pair. In addition, in the element 5, an electrostatic capacitance C51 is formed between the movable electrode finger 561 and the fixing electrode finger 513 which form a pair, and an electrostatic capacitance C52 is formed between the movable electrode finger 571 and the fixing electrode finger 523 which form a pair. In addition, in the element 6, an electrostatic capacitance C61 is formed between the movable electrode finger 661 and the fixing electrode finger 613 which form a pair, and an electrostatic capacitance C62 is formed between the movable electrode finger 671 and the fixing electrode finger 623 which form a pair.

If the acceleration Ax acts on the physical quantity sensor 1 on the plus side in the X-axis direction, the element 3 is displaced on the minus side in the X-axis direction with respect to the fixing portion 33, based on a magnitude of the acceleration Ax, while the movable portion 34 elastically deforms the spring 35. Accordingly, a gap between the movable electrode finger 361 and the fixing electrode finger 313 is reduced to increase the electrostatic capacitance C31 therebetween, and in contrast to this, a gap between the movable electrode finger 371 and the fixing electrode finger 323 is widened to reduce the electrostatic capacitance C32 therebetween. Meanwhile, the element 4 is displaced on the minus side in the X-axis direction with respect to the fixing portion 43 while the movable portion 44 elastically deforms the spring 45. Accordingly, a gap between the movable electrode finger 471 and the fixing electrode finger 423 is reduced to increase the electrostatic capacitance C42 therebetween, and in contrast to this, a gap between the movable electrode finger 461 and the fixing electrode finger 413 is widened to reduce the electrostatic capacitance C41 therebetween. Changes in the electrostatic capacitances C31 and C42 are output from the wire 72 as a first X-axis detection signal, and changes of the electrostatic capacitances C32 and C41 are output from the wire 73 as a second X-axis detection signal. The first X-axis detection signal and the second X-axis detection signal are differentially calculated, and it is possible to detect the acted acceleration Ax, based on the calculation result.

In a case where the acceleration Ax acts on the physical quantity sensor 1 on the minus side in the X-axis direction, an operation opposite to the above description is performed. Accordingly, a detailed description thereof will be omitted.

If the acceleration Ay acts on the physical quantity sensor 1 on the plus side in the Y-axis direction, the element 5 is displaced on the minus side in the Y-axis direction with respect to the fixing portion 53, based on a magnitude of the acceleration Ay, while the movable portion 54 elastically deforms the spring 55. Accordingly, a gap between the movable electrode finger 561 and the fixing electrode finger 513 is reduced to increase the electrostatic capacitance C51 therebetween, and in contrast to this, a gap between the movable electrode finger 571 and the fixing electrode finger 523 is widened to reduce the electrostatic capacitance C52 therebetween. Meanwhile, the element 6 is displaced on the minus side in the X-axis direction with respect to the fixing portion 63 while the movable portion 64 elastically deforms the spring 65. Accordingly, a gap between the movable electrode finger 671 and the fixing electrode finger 623 is reduced to increase the electrostatic capacitance C62 therebetween, and in contrast to this, a gap between the movable electrode finger 661 and the fixing electrode finger 613 is widened to reduce the electrostatic capacitance C61 therebetween. Changes of the capacitances C51 and C62 are output from the wire 74 as a first Y-axis detection signal, and changes of the capacitances C52 and C61 are output from the wire 75 as a second Y-axis detection signal. The first Y-axis detection signal and the second Y-axis detection signal are differentially calculated, and it is possible to detect the acted acceleration Ay, based on the calculation result.

If the acceleration acts on the physical quantity sensor 1 Ax on the minus side in the Y-axis direction, an operation opposite to the above description is performed. Accordingly, a detailed description thereof will be omitted.

As described above, the physical quantity sensor 1 can detect the acceleration Ax in the X-axis direction and the acceleration Ay in the Y-axis direction. Even if the acceleration Ax acts, each of the electrostatic capacitances C51 and C52 of the element 5 and the electrostatic capacitances C61 and C62 of the element 6 does not substantially change. Accordingly, the elements 5 and 6 are not used for detecting the acceleration Ax. Likewise, even if the acceleration Ay acts, the electrostatic capacitances C31 and C32 of the element 3 and the electrostatic capacitances C41 and C42 of the element 4 do not substantially change. Accordingly, the elements 3 and 4 are not used for detecting the acceleration Ay. In this way, the elements 3 and 4 are used for detecting the acceleration Ax and the elements 5 and 6 are used for detecting the acceleration Ay, and thereby, the physical quantity sensor 1 can simultaneously detect the acceleration Ax and the acceleration Ay.

Very excellent advantages of the physical quantity sensor 1 will be described. As illustrated in FIG. 1, in the physical quantity sensor 1, bonding pads with the substrate 2 are collectively arranged in one place in a relatively narrow region for each of the elements 3, 4, 5, and 6. Accordingly, the following effects can be exerted.

The element 3 will be Representatively described. The fixing portions 33, 311, and 321 are collectively arranged in one place. Specifically, the fixing portions 33, 311, and 321 are arranged side by side in the Y-axis direction, and the fixing portions 311 and 321 are located on both sides with the fixing portion 33 interposed therebetween. That is, other structure bodies are not located between the fixing portion 33 and the fixing portion 311 and between the fixing portion 33 and the fixing portion 321, respectively. According to the arrangement, the bonding pads 311*a* and 321*a* of the fixing portions 311 and 321 can be arranged near the bonding pad 331 of the fixing portion 33. Accordingly, it is possible to suppress influence of heat deflection (warpage or deflection caused by heat) of the substrate 2 to a small level, and to exert excellent temperature characteristics.

More specifically, as illustrated in FIG. 6, even if heat deflection of the substrate 2 occurs, shifting of the fixing electrode finger 313 from the movable electrode finger 361 is substantially equal to shifting of the fixing electrode finger 323 from the movable electrode finger 371. Accordingly, although magnitudes of the electrostatic capacitances C31 and C32 change due to the heat deflection of the substrate 2, a difference |C31−C32| does not substantially change. As described above, since the acceleration Ax is detected based on the difference between the electrostatic capacitances C31 and C32, the change in the difference between the electrostatic capacitances C31 and C32 due to the heat deflection (that is, a factor other than the acceleration Ax) of the substrate 2 is suppressed, and thereby, excellent temperature characteristics are exerted and the acceleration Ax can be detected accurately.

A separation distance between the fixing portion 33 and the fixing portion 311 and a separation distance D1 (see FIG. 4) between the fixing portion 33 and the fixing portion 321 are not limited in particular, and are preferably greater than or equal to 1 μm and smaller than or equal to 10 μm, for example. Thereby, the fixing portions 311 and 321 can be arranged sufficiently close to the fixing portion 33. In addition, a distance D2 (see FIG. 4) between an end of the fixing portion 311 on the plus side in the Y-axis direction and an end of the fixing portion 321 on the minus side in the Y-axis direction are not limited in particular, and are preferably greater than or equal to approximately 50 μm and smaller than or equal to approximately 300 μm, for example. Thereby, the above-described effects can be exerted more reliably, and a bonding strength of the fixing portions 33, 311, and 321 to the substrate 2 can be sufficiently kept high.

In addition, as described above, in the physical quantity sensor 1, the elements 3 and 4 are arranged point-symmetrically to the intersection point O, and the elements 5 and 6 are arranged point-symmetrically to the intersection point O. Accordingly, the following effects can be exerted.

As described above, in the elements 3, 4, 5, 6, the movable portions 34, 44, 54, and 64 are cantilever-supported to the fixing portions 33, 43, 53, and 63 via the springs 35, 45, 55, and 65. Accordingly, while a size of the physical quantity sensor 1 is reduced, vibration (unnecessary vibration other than detected vibration) of a rotation system around the Z axis is likely to occur in the movable portions 34, 44, 54, and 64. If the vibration of the rotation system occurs in the movable portions 34, 44, 54, and 64, the electrostatic capacitances C31, C32, C41, C42, C51, C52, C61, and C62 are changed, and detection accuracy of the accelerations Ax and Ay decreases. However, the physical quantity sensor 1 can suppress a decrease in detection accuracy of the accelerations Ax and Ay due to the unnecessary vibration. That is, the physical quantity sensor 1 can detect the accelerations Ax and Ay with high accuracy and a size thereof can be reduced.

Specifically, as illustrated in FIG. 7, if an angular velocity ωz around the Z axis acts on the physical quantity sensor 1, the movable portions 34, 44, 54, and 64 are displaced around the Z axis with respect to the fixing portions 33, 43, 53, and 63 in the same manner.

If the angular velocity ωz acts, the gap between the fixing electrode finger 313 and the movable electrode finger 361, the gap between the fixing electrode finger 323 and the movable electrode finger 371, the gap between the fixing electrode finger 413 and the movable electrode finger 461, and the gap between the fixing electrode finger 423 and the movable electrode finger 471 are all reduced or all widened (widened in FIG. 7), in the element 3 and the element 4 that detect the acceleration Ax. The reducing and the widening are substantially the same. That is, the electrostatic capacitances C31, C32, C41, and C42 are all increased by the same amount, or are all reduced by the same amount. Accordingly, although the angular velocity ωz acts, a difference between the first X-axis detection signal taken out from the wire 72 and the second X-axis detection signal taken out from the wire 73 is not substantially changed compared to a state in which the angular velocity ωz does not act. Thus, even in a state where the angular velocity ωz is applied, the acceleration Ax can be accurately detected.

Likewise, if the angular velocity ωz acts, the gap between the fixing electrode finger 513 and the movable electrode finger 561, the gap between the fixing electrode finger 523 and the movable electrode finger 571, the gap between the electrode finger 613 and the movable electrode finger 661, and the gap between the fixing electrode finger 623 and the movable electrode finger 671 are all reduced or all widened (widened in FIG. 7), in the element 5 and the element 6 that detect the acceleration Ay. The reducing and the widening are substantially the same. That is, the electrostatic capacitances C51, C52, C61, and C62 are all increased by the same amount, or are all reduced by the same amount. Accordingly, although the angular velocity ωz acts, a difference between the first Y-axis detection signal taken out from the wire 74 and the second Y-axis detection signal taken out from the wire 75 is not substantially changed compared to a state where the angular velocity ωz does not act. Thus, even in a state where the angular velocity ωz is applied, the acceleration Ay can be accurately detected.

As described above, according to the physical quantity sensor 1, it is hard to be influenced by the angular velocity ωz, and it is possible to detect the accelerations Ax and Ay with high accuracy and to reduce a size of an apparatus.

The physical quantity sensor 1 is described above in detail. As described above, the physical quantity sensor 1 includes the substrate 2, a pair of elements 3 and 4 (first element) which are located on the substrate 2 and detect the acceleration Ax in the X-axis direction (first direction), and a pair of elements 5 and 6 (second element) which are located on the substrate 2 and detect the acceleration Ay in the Y-axis direction (second direction) orthogonal to the X-axis direction. The elements 3 and 4 includes the movable portions 34 and 44 (first movable portion) which are displaceable in the X-axis direction with respect to the substrate 2, the movable electrode fingers 361 and 471 (first movable electrode fingers) and movable electrode fingers 471 and 461 (second movable electrode fingers) which are disposed on the movable portions 34 and 44, the fixing electrode fingers 313 and 423 (first fixing electrode fingers) which are arranged on the minus side (one side) of the X-axis direction with respect to the movable electrode fingers 361 and 471, the fixing portions 311 and 421 (first support portions) which are fixed to the substrate 2 and support the fixing electrode fingers 313 and 423, the fixing electrode fingers 323 and 413 (second fixing electrode fingers) which are arranged on the plus side (the other side) of the X-axis direction with respect to the movable electrode fingers 371 and 461, and the fixing portions 321 and 411 (second support portions) which are fixed to the substrate 2, are juxtaposed with the fixing portions 311 and 421, and support the fixing electrode fingers 323 and 413, respectively. In addition, the elements 5 and 6 include the movable portions 54 and 64 (second movable portions) displaceable in the Y-axis direction with respect to the substrate 2, the movable electrode fingers 561 and 671 (third movable electrode finger) and the movable electrode fingers 571 and 661 (fourth movable electrode fingers) which are arranged in the movable portions 54 and 64, the fixing electrode fingers 513 and 623 (third fixing electrode fingers) arranged on the minus side (one side) of the Y-axis direction with respect to the movable electrode fingers 561 and 671, the fixing portions 511 and 621 (third support portions) which are fixed to the substrate 2 and support the fixing electrode fingers 513 and 623, the fixing electrode fingers 523 and 613 (fourth fixing electrode fingers) disposed on the plus side (the other side) of the Y-axis direction with respect to the movable electrode fingers 571 and 661, and the fixing portions 521 and 611 (fourth support portion) which are fixed to the substrate 2, juxtaposed with the fixing portions 511 and 621, and support the fixing electrode fingers 523 and 613, respectively.

Accordingly, the fixing portions can be collectively arranged in a narrow region for each of the elements 3, 4, 5, and 6. That is, the fixing portions 33, 311, and 321 can be collectively arranged in a narrow area in the element 3, the fixing portions 43, 411, and 421 can be collectively arranged in a narrow region in the element 4, the fixing portions 53, 511, and 521 can be collectively arranged in a narrow area in the element 5, and the fixing portions 63, 611, and 621 can be collectively arranged in a narrow region in the element 6. As a result, as described above, it is possible to suppress influence on the heat deflection of the substrate 2 to a small extent, to exert excellent temperature characteristics, and to accurately detect the accelerations Ax and Ay.

As described above, the pair of elements 3 and 4 include the fixing portions 33 and 43 (first fixing portions) fixed to the substrate 2, and the springs 35 and 45 (first springs) connecting the fixing portions 33 and 43 to the movable portions 34 and 44, respectively. The movable portions 34 and 44 are cantilever-supported to the fixing portions 33 and 43 via the springs 35 and 45. Likewise, the pair of elements 5 and 6 include the fixing portions 53 and 63 (second fixing portions) fixed to the substrate 2, and the springs 55 and 65 (second springs) connecting the fixing portions 53 and 63 to the movable portions 54 and 64. The movable portions 54 and 64 are cantilever-supported to the fixing portions 53 and 63 via the springs 55 and 65. Thereby, as described above, it is possible to reduce sizes of the elements 3, 4, 5, and 6 and to reduce a size of the physical quantity sensor 1.

In addition, as described above, if the angular velocity ωz obtained by using the Z-axis direction (third direction) orthogonal to the X-axis direction and the Y-axis direction as an axis is applied, the separation distances between the movable electrode fingers 361 and 471 and the fixing electrode fingers 313 and 423, and the separation distance between the movable electrode fingers 371 and 461 and the fixing electrode fingers 323 and 413 are separated from or approach each other, in the elements 3 and 4. In addition, in the elements 5, 6, the separation distances between the movable electrode fingers 561 and 671 and the fixing electrode fingers 513 and 623, and the separation distance between the movable electrode fingers 571 and 661 and the fixing electrode fingers 523 and 613 are separated from or approach each other. Thereby, as described above, it is hard to be influenced by the angular velocity ωz, and even in a state where the angular velocity ωz acts, the accelerations Ax and Ay can be accurately detected.

In addition, as described above, when the first virtual line Lx in the X-axis direction and the second virtual line Ly, which is orthogonal to the first virtual line Lx, in the Y-axis direction are set, and among the four quadrants partitioned by the first virtual line Lx and the second virtual line Ly in a plan view, one set of quadrants facing each other with respect to the intersection point O of the first virtual line Lx and the second virtual line Ly is referred to as a first quadrant E1 and a second quadrant E2, and the other set is referred to as a third quadrant E3 and a fourth quadrant E4, one of the elements 3 and 4 is disposed in the first quadrant E1 and the other is disposed in the second quadrant E2, and one of the elements 5 and 6 is disposed in the third quadrant E3 and the other is disposed in the fourth quadrant E4. Thereby, as described above, it is possible to efficiently dispose the elements 3, 4, 5, and 6 at a smaller space. Accordingly, it is possible to reduce a size of the physical quantity sensor 1.

In addition, as described above, the elements 3 and 4 are disposed point-symmetrically with respect to the intersection point O, and the elements 5 and 6 are disposed point-symmetrically with respect to the intersection point O. Thereby, it is possible to dispose the elements 3, 4, 5, and 6 in a well-balanced manner.

A configuration of the physical quantity sensor 1 is described above, the configuration of the physical quantity sensor 1 is not limited to the present embodiment. For example, the disposition of the elements 3, 4, 5, 6 is not limited in particular, and as illustrated in FIG. 8, the element 3 may be disposed in the first quadrant E1, the element 6 may be disposed in the second quadrant E2, the element 5 may be disposed in the third quadrant E3, and the element 4 may be disposed in the fourth quadrant E4.

Second Embodiment

A physical quantity sensor according to a second embodiment will be described.

Figure 9:
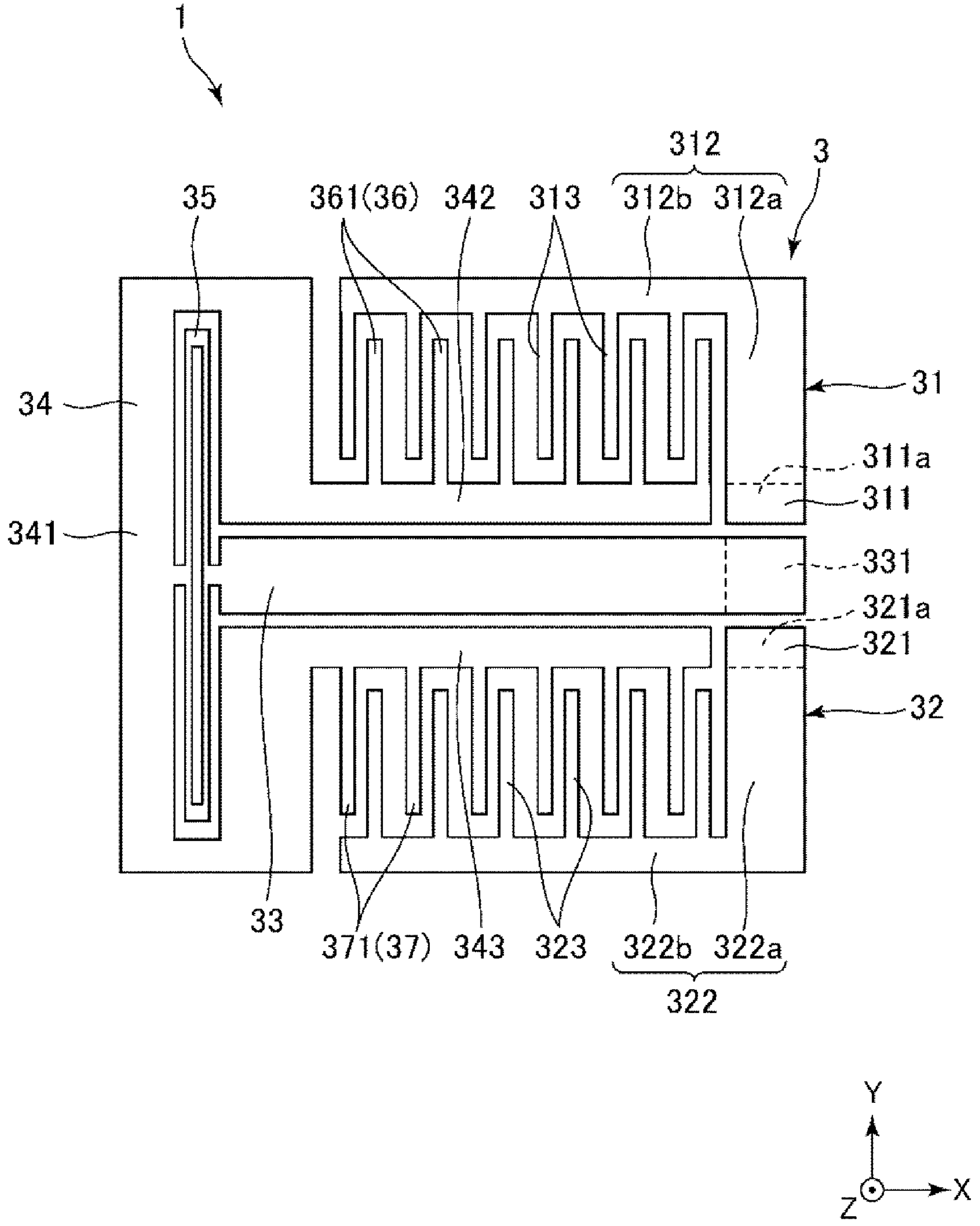
FIG. 9 is a plan view illustrating a physical quantity sensor according to a second embodiment.

FIG. 9 is a plan view illustrating the physical quantity sensor according to the second embodiment.

The physical quantity sensor 1 according to the present embodiment is the same as the physical quantity sensor 1 according to the first embodiment described above except that the configurations of the elements 3, 4, 5, and 6 are different.

In the following description, a difference between the physical quantity sensor 1 according to the second embodiment and the physical quantity sensor according to the first embodiment will be mainly described, and description on the same matters will be omitted. In addition, in FIG. 5, the same reference numerals or symbols are attached to the same configurations as in the first embodiment described above.

In addition, in the present embodiment, in the same manner as in the first embodiment described above, the elements 3, 4, 5, and 6 are identical in configuration and are different in orientation only, and thus, in the following description, the configuration of the element 3 will be described, and the configurations of the element 4, 5, and 6 will be omitted.

As illustrated in FIG. 9, in the element 3 according to the present embodiment, the movable portion 34 has a shape that follows contours of the fixing portion 33 and the spring 35. A plurality of movable electrode fingers 361 extend from the second extension portion 342 toward the plus side in the Y-axis direction, and a plurality of movable electrode fingers 371 extend from the third extension portion 343 toward the minus side in the Y-axis direction.

In addition, in the first fixing electrode 31, the trunk 312 includes a first portion 312*a* extending from the fixing portion 311 toward the plus side in the Y-axis direction, and a second portion 312*b* extending from a front end of the first portion 312*a* toward the minus side in the X-axis direction. In addition, the second portion 312*b* is located on the plus side in the Y-axis direction with respect to the second extension portion 342, and the plurality of fixing electrode fingers 313 extend from the second portion 312*b* toward the minus side in the Y-axis direction.

Likewise, in the second fixing electrode 32, the trunk 322 includes a first portion 322*a* extending from the fixing portion 321 to the minus side in the Y-axis direction, and a second portion 322*b* extending from a front end of the first portion 322*a* toward the minus side in the X-axis direction. In addition, the second portion 322*b* is located on the minus side in the Y-axis direction with respect to the third extension portion 343, and the plurality of fixing electrode fingers 323 extend from the second portion 322*b* toward the plus side in the Y-axis direction.

Also in the second embodiment, the same effects as in the first embodiment described above can be obtained.

Third Embodiment

A physical quantity sensor according to a third embodiment will be described.

Figure 10:
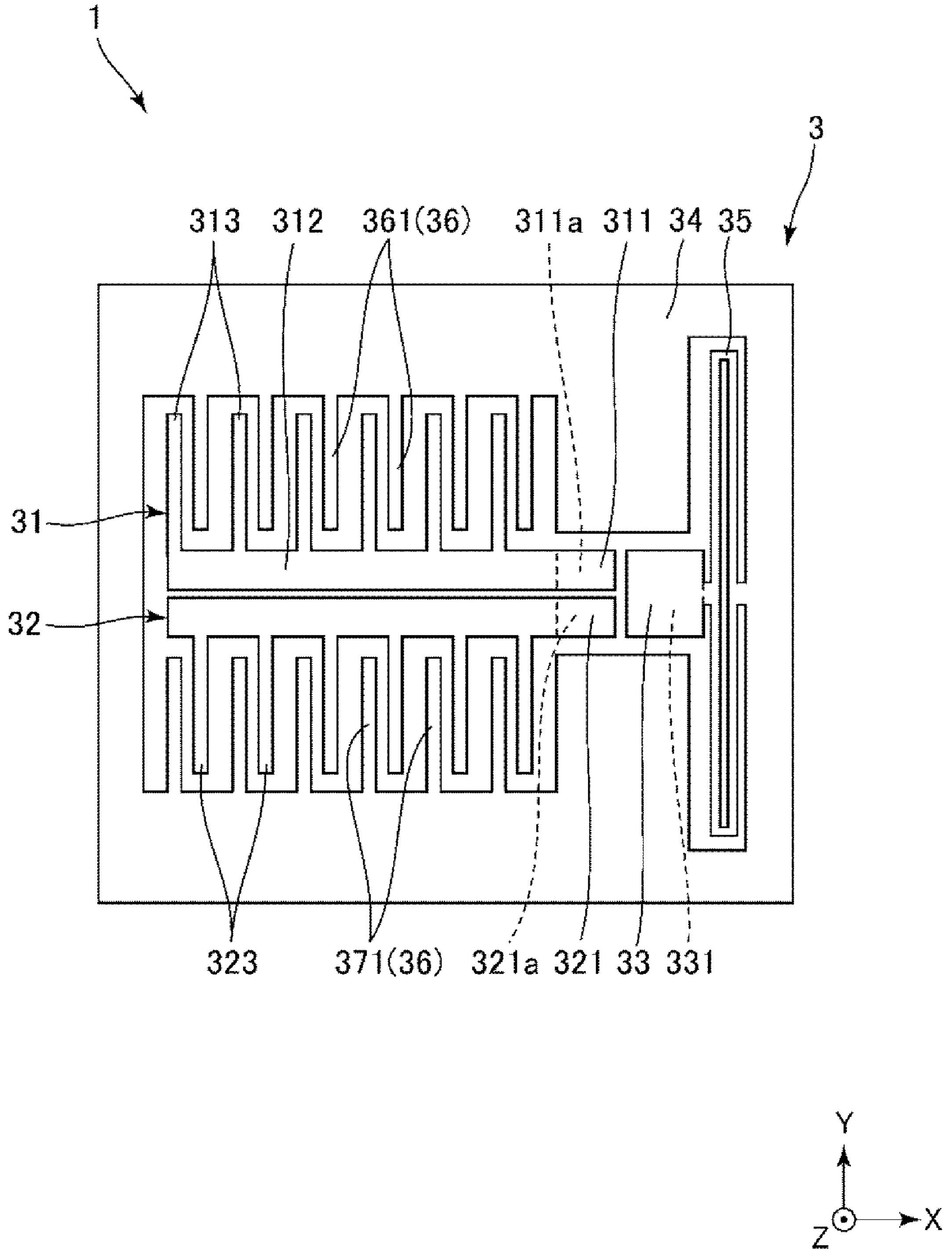
FIG. 10 is a plan view illustrating a physical quantity sensor according to a third embodiment.

FIG. 10 is a plan view illustrating the physical quantity sensor according to the third embodiment.

The physical quantity sensor 1 according to the present embodiment is the same as the physical quantity sensor 1 according to the first embodiment described above except that the configurations of the elements 3, 4, 5, and 6 are different.

In the following description, a difference between the physical quantity sensor 1 according to the third embodiment and the physical quantity sensor according to the first embodiment will be mainly described, and description on the same matters will be omitted. In addition, in FIG. 5, the same reference numerals or symbols are attached to the same configuration as in the first embodiment described above.

In addition, in the present embodiment, in the same manner as in the first embodiment described above, the elements 3, 4, 5, and 6 are identical in configuration and are different in orientation only, and thus, in the following description, a configuration of the element 3 will be representatively described and configurations of the elements 4, 5, and 6 will be omitted.

As illustrated in FIG. 10, in the element 3 according to the present embodiment, the movable portion 34 has a frame shape surrounding the fixing portion 33 and the first and second fixing electrodes 31 and 32. In addition, the spring 35 is located on the plus side in the X-axis direction with respect to the fixing portion 33, and the first and second fixing electrodes 31 and 32 are located on the minus side in the X-axis direction. The fixing portions 311 and 321 are disposed side by side in the Y-axis direction, and furthermore, are disposed side by side in the X-axis direction together with the fixing portion 33.

Also in the third embodiment, the same effects as in the first embodiment described above can be obtained.

Fourth Embodiment

A physical quantity sensor according to a fourth embodiment will be described.

Figure 11:
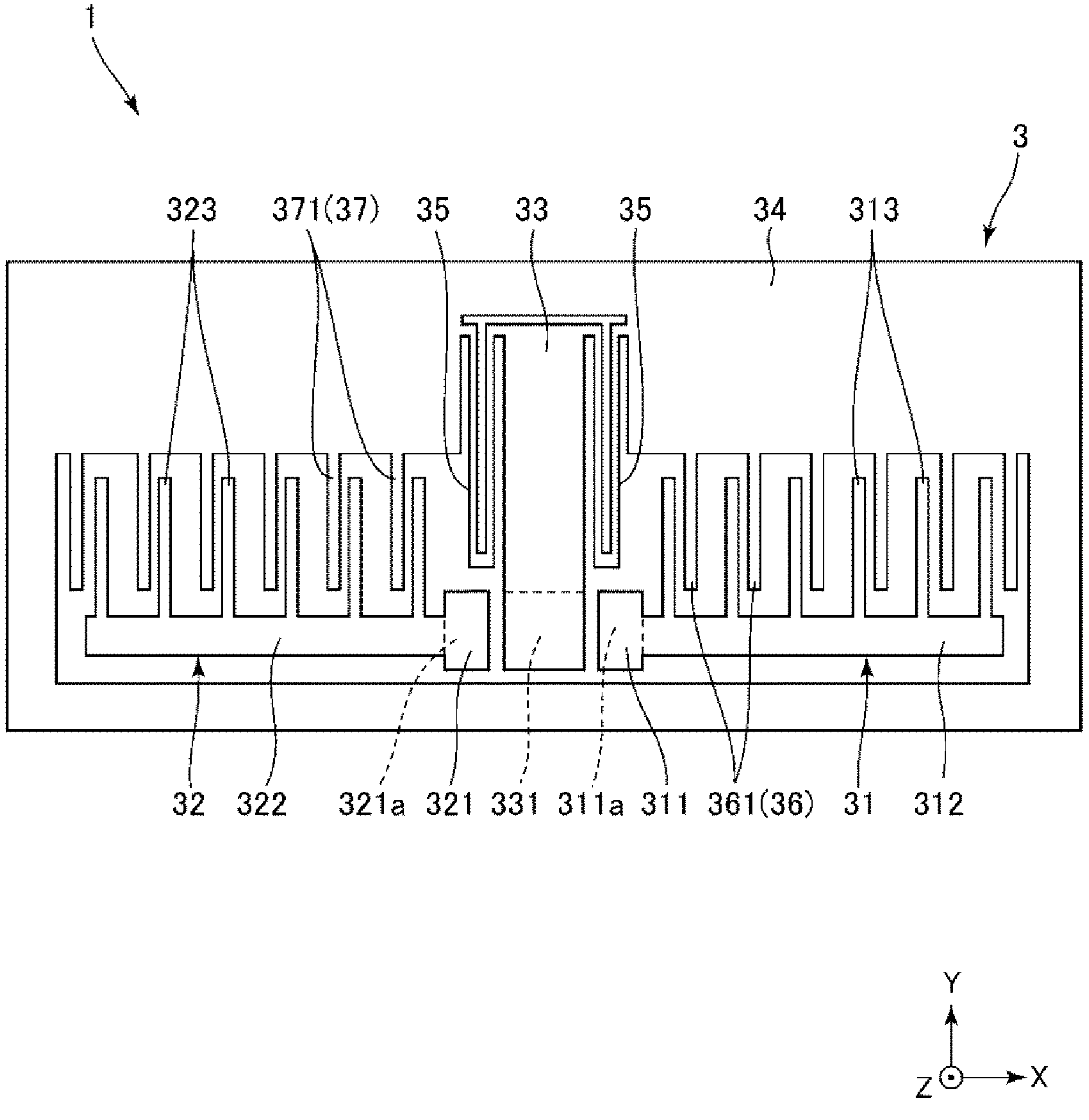
FIG. 11 is a plan view illustrating a physical quantity sensor according to a fourth embodiment.

FIG. 11 is a plan view illustrating the physical quantity sensor according to the fourth embodiment.

The physical quantity sensor 1 according to the present embodiment is the same as the physical quantity sensor 1 according to the first embodiment described above except that the configurations of the elements 3, 4, 5, 6 are different.

In the following description, a difference between the physical quantity sensor 1 according to the fourth embodiment and the physical quantity sensor according to the first embodiment described above will be mainly described, and description on the same matters will be omitted. In addition, in FIG. 5, the same reference numerals or symbols are attached to the same configurations as in the first embodiment described above.

In addition, in the present embodiment, in the same manner as in the first embodiment described above, the elements 3, 4, 5, and 6 are identical in configuration and are different in orientation only, and thus, in the following description, the configuration of the element 3 will be representatively described, and the configurations of the elements 4, 5, and 6 will be omitted.

As illustrated in FIG. 11, in the element 3 according to the present embodiment, the movable portion 34 has a frame shape surrounding the fixing portion 33 and the first and second fixing electrodes 31 and 32. In addition, the fixing portion 33 extends in the Y-axis direction and includes a bonding pad 331 at an end on the minus side in the Y-axis direction. In addition, the spring 35 connects the movable portion 34 to an end on the plus side in the Y-axis direction with respect to the fixing portion 33.

In addition, the first fixing electrode 31 is located on the plus side in the X-axis direction with respect to the fixing portion 33, and the second fixing electrode 32 is located on the minus side in the X-axis direction. The first fixing electrode 31 includes the fixing portion 311, the trunk 312 extending from the fixing portion 311 toward the plus side in the X-axis direction, and a plurality of fixing electrode fingers 313 extending from the trunk 312 on the plus side in the Y-axis direction. In addition, the fixing portion 311 is juxtaposed with the fixing portion 33. Meanwhile, the second fixing electrode 32 includes the fixing portion 321, the trunk 322 extending from the fixing portion 321 toward the minus side in the X-axis direction, and the plurality of fixing electrode fingers 323 extending from the trunk 322 toward the plus side in the Y-axis direction. In addition, the fixing portion 321 is juxtaposed with the fixing portion 33 and is disposed side by side in the Y-axis direction with the fixing portion 311 so as to interpose the fixing portion 33 therebetween.

Also in the fourth embodiment, the same effects as in the first embodiment described above can be achieved.

Fifth Embodiment

A physical quantity sensor device according to a fifth embodiment of the invention will be described.

Figure 12:
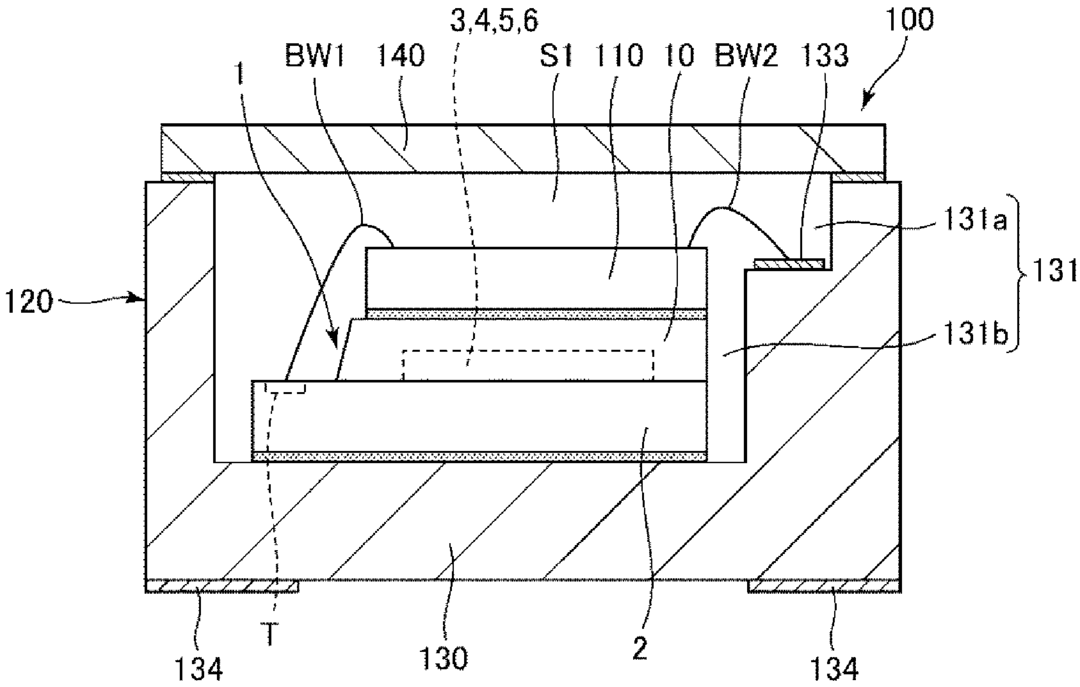
FIG. 12 is a cross-sectional view illustrating a physical quantity sensor device according to a fifth embodiment.

FIG. 12 is a cross-sectional view illustrating the physical quantity sensor device according to the fifth embodiment.

As illustrated in FIG. 12, a physical quantity sensor device 100 includes the physical quantity sensor 1, a circuit element 110, and a package 120 that stores the physical quantity sensor 1 and the circuit element 110. The physical quantity sensor 1 is not limited in particular, for example, the configuration of the above-described embodiment can be used as the physical quantity sensor. The physical quantity sensor device 100 can be suitably used as an inertial measurement unit (IMU).

The circuit element 110 (IC) is bonded to the lid 10 of the physical quantity sensor 1 via a bonding member. In addition, the circuit element 110 is electrically connected to each terminal T of the physical quantity sensor 1 via a bonding wire BW1 and is electrically connected to the package 120 (an internal terminal 133 to be described below) via a bonding wire BW2. The circuit element 110 includes a drive circuit that drives the physical quantity sensor 1, a detection circuit that detects acceleration based on an output signal from the physical quantity sensor 1, a correction circuit that corrects the detected acceleration, an output circuit that converts a signal from the detection circuit into a predetermined signal and outputs the signal, and the like, as necessary. The circuit element 110 may be provided outside the package 120 or may be omitted.

The package 120 includes a base 130 and a lid 140 bonded to an upper surface of the base 130 so as to form a storage space S1 for storing the physical quantity sensor 1 and the circuit element 110 between the base 130 and the lid.

The base 130 has a cavity shape including a recessed portion 131 whose upper surface is open. In addition, the recessed portion 131 includes a first recessed portion 131*a* which is open on an upper surface of the base 130 and a second recessed portion 131*b* which is open on a bottom surface of the first recessed portion 131*a*.

Meanwhile, the lid 140 has a plate shape and is bonded to an upper surface of the base 130 so as to close an opening of the recessed portion 131. In this way, the storage space S1 is formed by closing the opening of the recessed portion 131 with the lid 140, and the physical quantity sensor 1 and the circuit element 110 are stored in the storage space S1.

The storage space S1 is airtightly sealed and has the same atmosphere as the storage space S of the physical quantity sensor 1. Thereby, even if airtightness of the storage space S is collapsed and the storage space S communicates with the storage space S1, the atmosphere in the storage space S can be maintained as it is. Accordingly, it is possible to suppress a change in physical quantity detection characteristics of the physical quantity sensor 1 due to a change in the atmosphere of the storage space S, and the physical quantity sensor device 100 can perform a stable drive. The "same atmosphere" is not limited to a case of perfect matching, and also includes a case where there is an inevitable manufacturing error such as slightly different pressures in both spaces. In addition, the atmosphere of the storage space S1 does not have to be the same as the storage space S.

A configuration material of the base 130 is not limited in particular, and various ceramics, for example, oxide ceramics such as alumina, silica, titania, and zirconia, nitride ceramics such as silicon nitride, aluminum nitride, and titanium nitride, or the like can be used as the configuration material. In this case, the base 130 can be manufactured by baking a staking body of a ceramic sheet (green sheet). With such a configuration, it is possible to simply form the recessed portion 131.

In addition, a material of the lid 140 is not limited in particular, and may be a member having a linear expansion coefficient close to a linear expansion coefficient of the configuration material of the base 130. For example, in a case where the configuration material of the base 130 is ceramics described above, it is preferable to use an alloy such as Kovar.

In addition, the base 130 includes a plurality of internal terminals 133 arranged on a bottom surface of the first recessed portion 131*a* and a plurality of external terminals 134 arranged on a lower surface. Each internal terminal 133 is electrically connected to a predetermined external terminal 134 via an internal wire (not illustrated) disposed in the base 130. In addition, each of the plurality of internal terminals 133 is electrically connected to the circuit element 110 via the bonding wire BW2. Thereby, the outside of the package 120 can be electrically connected to the circuit element 110, and the physical quantity sensor device 100 can be easily mounted.

The physical quantity sensor device 100 is described above. As described above, the physical quantity sensor device 100 includes the physical quantity sensor 1 and the circuit element 110. Accordingly, the effects of the aforementioned physical quantity sensor 1 can be obtained, and the physical quantity sensor device 100 has a high reliability.

The configuration of the physical quantity sensor device 100 is not limited in particular, and, for example, the physical quantity sensor 1 and the circuit element 110 may be disposed in reverse. That is, the circuit element 110 may be disposed on the bottom surface of the recessed portion 131, and the physical quantity sensor 1 may be disposed on the upper surface of the circuit element 110. In addition, the circuit element 110 and the physical quantity sensor 1 may be molded with a molding material without the package 120.

Sixth Embodiment

An electronic apparatus according to a sixth embodiment will be described.

Figure 13:
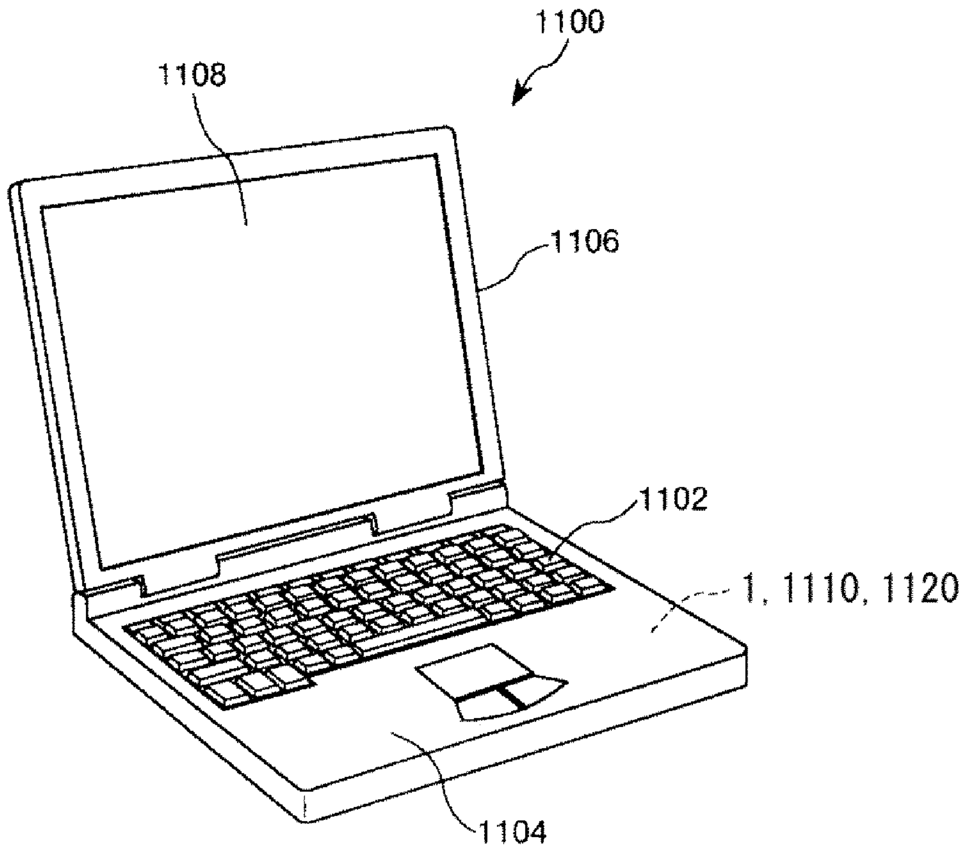
FIG. 13 is a perspective view illustrating an electronic apparatus according to a sixth embodiment.

FIG. 13 is a perspective view illustrating the electronic apparatus according to the sixth embodiment.

A mobile type (or notebook type) personal computer 1100 illustrated in FIG. 13 is an apparatus to which the electronic apparatus according to the invention is applied. In this figure, the personal computer 1100 is configured with a main body portion 1104 including a keyboard 1102, and a display unit 1106 including a display portion 1108. The display unit 1106 is rotatably supported to the main body portion 1104 via a hinge structure portion.

The personal computer 1100 stores the physical quantity sensor 1, a control circuit 1110 that controls driving of the physical quantity sensor 1, and a correction circuit 1120 that corrects a physical quantity detected by the physical quantity sensor 1, for example, based on the ambient temperature therein. The physical quantity sensor 1 is not limited in particular, and can also be used for, for example, any of the respective embodiments described above.

The personal computer 1100 (electronic apparatus) includes the physical quantity sensor 1, the control circuit 1110, and the correction circuit 1120. Accordingly, the effects of the physical quantity sensor 1 described above can be obtained, and a high reliability can be exerted.

Seventh Embodiment

An electronic apparatus according to a seventh embodiment will be described.

Figure 14:
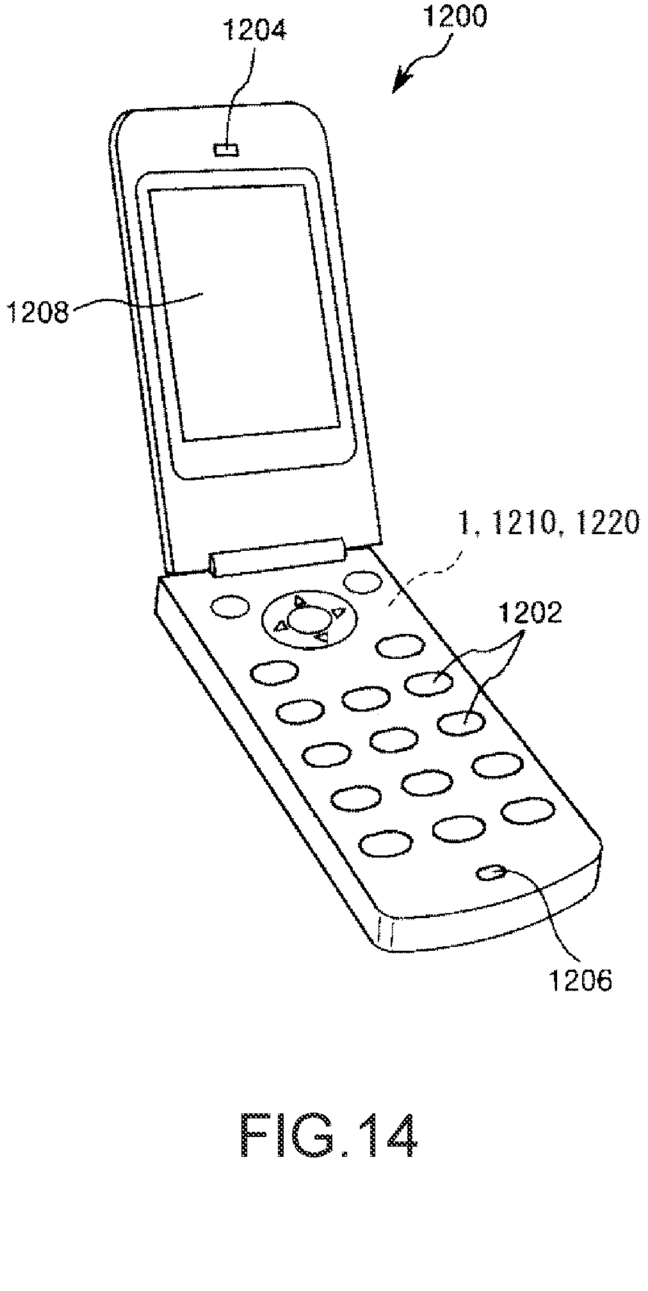
FIG. 14 is a perspective view illustrating an electronic apparatus according to a seventh embodiment.

FIG. 14 is a perspective view illustrating the electronic apparatus according to the seventh embodiment.

A portable phone 1200 (including PHS) illustrated in FIG. 14 is an apparatus to which the electronic apparatus according to the invention is applied. In this figure, the portable phone 1200 includes an antenna (not illustrated), a plurality of operation buttons 1202, an earpiece 1204, and a mouthpiece 1206. A display unit 1208 is disposed between the operation button 1202 and the earpiece 1204.

The portable phone 1200 stores the physical quantity sensor 1, a control circuit 1210 that controls driving of the physical quantity sensor 1, and a correction circuit 1220 that corrects a physical quantity detected by the physical quantity sensor 1, for example, based on the ambient temperature therein. The physical quantity sensor 1 is not limited in particular, and may be used for, for example, any of the above-described embodiments.

The portable phone 1200 (electronic apparatus) described above includes the physical quantity sensor 1, the control circuit 1210, and the correction circuit 1220. Accordingly, the effects of the physical quantity sensor 1 described above can be obtained, and a high reliability can be exerted.

Eighth Embodiment

An electronic apparatus according to an eighth embodiment will be described.

Figure 15:
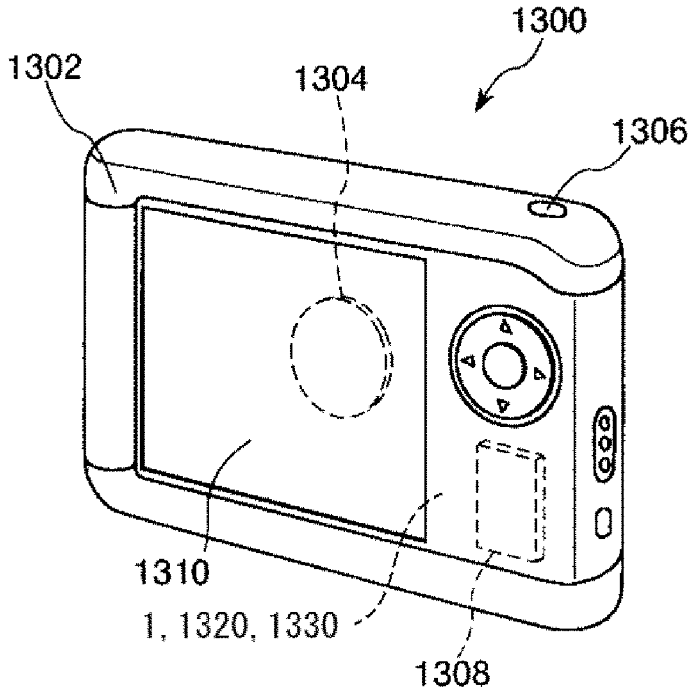
FIG. 15 is a perspective view illustrating an electronic apparatus according to an eighth embodiment.

FIG. 15 is a perspective view illustrating the electronic apparatus according to the eighth embodiment.

A digital still camera 1300 illustrated in FIG. 15 is an apparatus to which the electronic apparatus according to the invention is applied. In this figure, a display unit 1310 is provided on a rear surface of a case 1302, the display unit is configured to perform display based on an image-capturing signal from a CCD, and the display unit 1310 functions as a viewfinder for displaying a subject as an electronic image. In addition, a light receiving unit 1304 including an optical lens (image-capturing optical system), the CCD or the like is provided on a front side (a back side in the figure) of the case 1302. If an image capturing person confirms a subject image displayed on the display unit 1310 and presses a shutter button 1306, an image-capturing signal of the CCD is transferred and stored in the memory 1308 at that time.

The digital still camera 1300 stores the physical quantity sensor 1, a control circuit 1320 that controls driving of the physical quantity sensor 1, a correction circuit 1330 that corrects a physical quantity detected by the physical quantity sensor 1, for example, based on the ambient temperature therein. The physical quantity sensor 1 is not particularly limited, but any of the above-described embodiments can be used, for example.

The digital still camera 1300 (electronic apparatus) includes the physical quantity sensor 1, the control circuit 1320, and the correction circuit 1330. Accordingly, the effects of the physical quantity sensor 1 described above can be obtained, and a high reliability can be exerted.

In addition to the personal computer and the portable phone according to the embodiments described above, and the digital still camera according to the present embodiment, the electronic apparatus according to the invention can be applied to, for example, a smartphone, a tablet terminal, a watch (including a smart watch), an ink jet type ejection device (for example, an ink jet printer), a laptop type personal computer, a television, a wearable terminal such as a head mounted display (HMD), a video camera, a video tape recorder, a car navigation device, a pager, an electronic notebook (including a communication function), an electronic dictionary, a calculator, an electronic game machine, a word processor, a workstation, a videophone, a television monitor for crime prevention, an electronic binocular, a POS terminal, a medical apparatus (for example, an electronic clinical thermometer, a sphygmomanometer, a blood glucose meter, an electrocardiogram measurement device, an ultrasonic diagnostic device, an electronic endoscope), a fish finder, various measuring instruments, an apparatus for mobile terminal base station, instruments (for example, instruments of a vehicle, an aircraft, and a ship), a flight simulator, a network server, and the like.

Ninth Embodiment

A portable electronic apparatus according to a ninth embodiment will be described.

Figure 16:
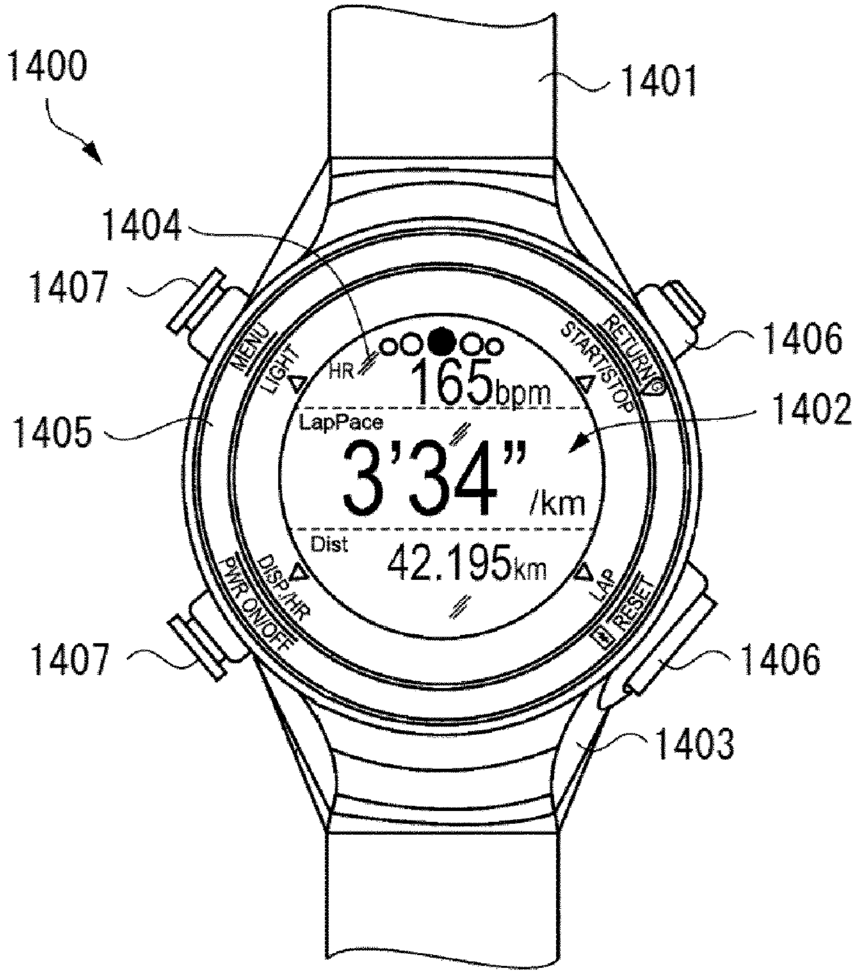
FIG. 16 is a plan view illustrating a portable electronic apparatus according to a ninth embodiment.
Figure 17:
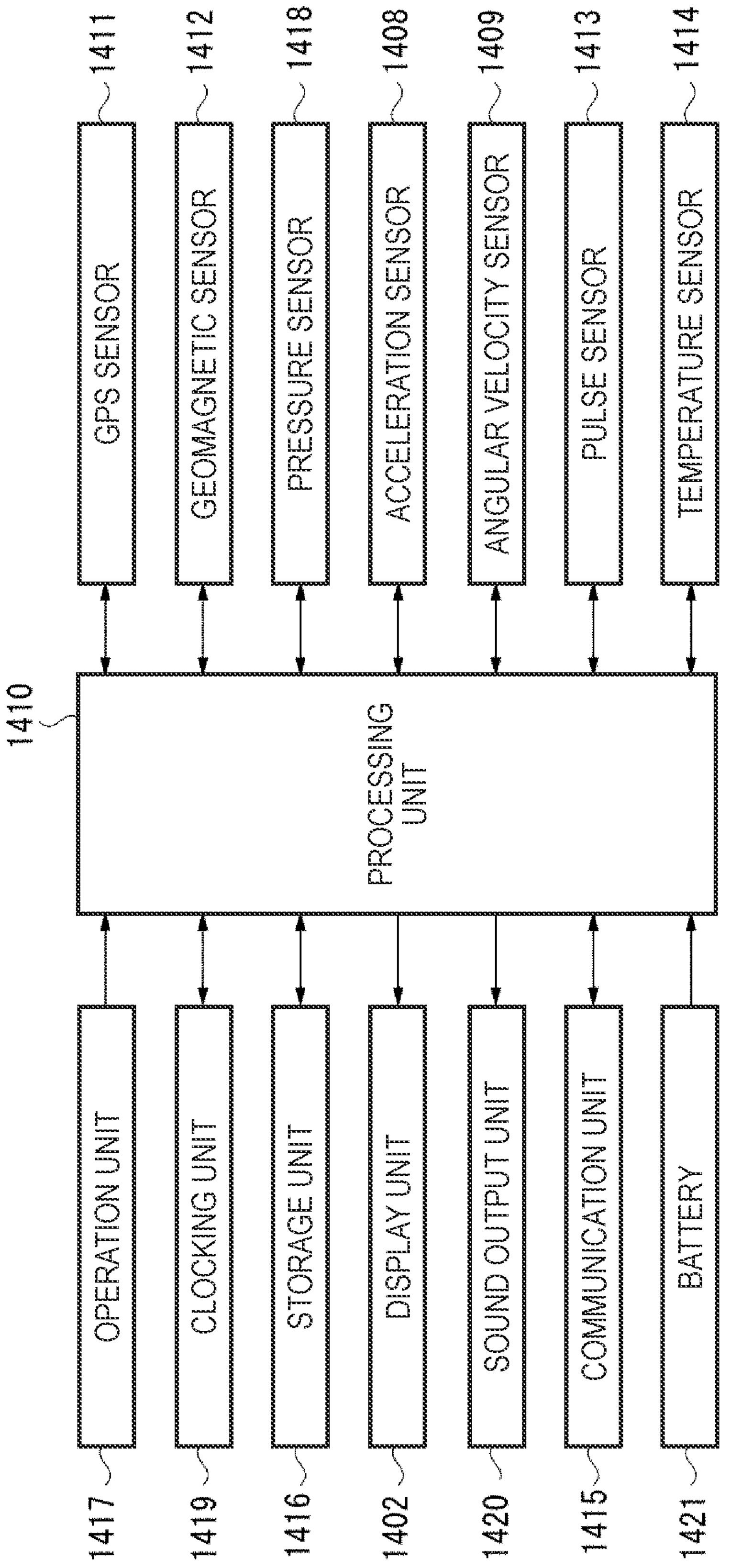
FIG. 17 is a functional block diagram illustrating a schematic configuration of the portable electronic apparatus illustrated in FIG. 16.

FIG. 16 is a plan view illustrating the portable electronic apparatus according to the ninth embodiment. FIG. 17 is a functional block diagram illustrating a schematic configuration of the portable electronic apparatus illustrated in FIG. 16.

A watch type activity meter 1400 (active tracker) illustrated in FIG. 16 is a wrist apparatus to which the portable electronic apparatus according to the invention is applied. The activity meter 1400 is attached to a part (subject) such as the wrist of a user by a band 1401. In addition, the activity meter 1400 includes a display unit 1402 for digital display and can perform wireless communication. The physical quantity sensor 1 according to the invention described above is incorporated in the activity meter 1400 as a sensor that measures acceleration or a sensor that measures an angular velocity.

The activity meter 1400 includes a case 1403 storing the physical quantity sensor 1, a processing unit 1410 that is stored in the case 1403 and processes output data from the physical quantity sensor 1, a display unit 1402 stored in the case 1403, and a light-transmitting cover 1404 that closes an opening of the case 1403. In addition, a bezel 1405 is provided outside the light-transmitting cover 1404. In addition, a plurality of operation buttons 1406 and 1407 are provided on a side surface of the case 1403.

As illustrated in FIG. 17, an acceleration sensor 1408 serving as the physical quantity sensor 1 detects accelerations in three axial directions intersecting (ideally orthogonal to) each other, and outputs a signal (acceleration signal) according to magnitudes and orientations of the detected three axial accelerations. In addition, an angular velocity sensor 1409 detects each angular velocity in three axial directions intersecting (ideally orthogonal to) each other, and outputs a signal (angular velocity signal) according to magnitudes and orientations of the detected three axial angular velocities.

A liquid crystal display (LCD) configuring the display unit 1402 displays, for example, location information obtained by using a GPS sensor 1411 or a geomagnetic sensor 1412, exercise information such as the amount of movement or the amount of exercise obtained by using the acceleration sensor 1408 or the angular velocity sensor 1409 included in the physical quantity sensor 1, biometric information such as a pulse rate obtained by using a pulse sensor 1413 or the like, time information such as current time, or the like in accordance with various detection modes. It is also possible to display an environmental temperature obtained by using a temperature sensor 1414.

A communication unit 1415 performs various controls for establishing communication between a user terminal and an information terminal (not illustrated). The communication unit 1415 is configured to include, for example, a transmission and reception apparatus corresponding to a short range wireless communication standard such as Bluetooth (registered trademark) (including Bluetooth low energy (BTLE)), Wireless-Fidelity (Wi-Fi: registered trademark), Zigbee (registered trademark), near field communication (NFC), and ANT+(registered trademark), and a connector corresponding to a communication bus standard such as the Universal Serial Bus (USB), and the like.

The processing unit 1410 (processor) is configured with, for example, a micro processing unit (MPU), a digital signal processor (DSP), an application specific integrated circuit (ASIC) or the like. The processing unit 1410 performs various types of processing, based on a program stored in the storage unit 1416 and a signal input from the operation unit 1417 (for example, the operation buttons 1406 and 1407). Processing performed by the processing unit 1410 includes data processing for each output signal of the GPS sensor 1411, the geomagnetic sensor 1412, a pressure sensor 1418, the acceleration sensor 1408, the angular velocity sensor 1409, the pulse sensor 1413, the temperature sensor 1414, and a clocking unit 1419, display processing for displaying an image on the display unit 1402, sound output processing for outputting a sound to a sound output unit 1420, communication processing for communicating with an information terminal via the communication unit 1415, power control processing for supplying power from the battery 1421 to each unit, and the like.

The activity meter 1400 can have at least the following functions.

1. Distance: a total distance from start of measurement performed by a highly accurate GPS function is measured.
2. Pace: a current driving pace is displayed from pace distance measurement.
3. Average speed: average speed from an average speed travel start to a current point of time is calculated and displayed.
4. Altitude: altitude is measured and displayed by the GPS function.
5. Stride: a stride is measured and displayed even in a tunnel where a GPS radio wave does not reach.
6. Pitch: the number of steps per minute is measured and displayed.
7. Heart rate: a heart rate is measured and displayed by a pulse sensor.
8. Gradient: a gradient of the ground is measured and displayed in training and trail runs in the mountain.
9. Auto wrap: when a person runs for a fixed distance set in advance or for a fixed time, a lap measurement is automatically performed.
10. Exercise consumption calorie: burned calories are displayed.
11. Step count: the total number of steps from exercise start is displayed.

The activity meter 1400 (portable electronic apparatus) includes the physical quantity sensor 1, the case 1403 storing the physical quantity sensor 1, the processing unit 1410 that is stored in the case 1403 and processes output data from the physical quantity sensor 1, the display unit 1402 stored in the case 1403, and the light-transmitting cover 1404 closing an opening portion of the case 1403. Accordingly, the effects of the physical quantity sensor 1 described above can be obtained and a high reliability can be exerted.

The activity meter 1400 can be widely applied to a running watch, a runner's watch, a runner's watch corresponding to multi-sports such as duathlon and triathlon, an outdoor watch, a GPS satellite positioning system such as a GPS watch in which GPS is mounted, and the like.

In addition, in the above description, a global positioning system (GPS) is used as a satellite positioning system, but another global navigation satellite system (GNSS) may be used. For example, one or more of the satellite positioning systems such as a European geostationary satellite navigation overlay service (EGNOS), a Quasi Zenith satellite system (QZSS), a global navigation satellite system (GLONASS), GALILEO, and a Bei Dou navigation satellite system (Bei Dou) may be used. In addition, a stationary satellite type satellite-based augmentation system (SBAS) such as a wide area augmentation system (WAAS), and a European geostationary-satellite navigation overlay service (EGNOS) may be used to at least one of the satellite positioning system.

Tenth Embodiment

A vehicle according to a tenth embodiment will be described.

Figure 18:
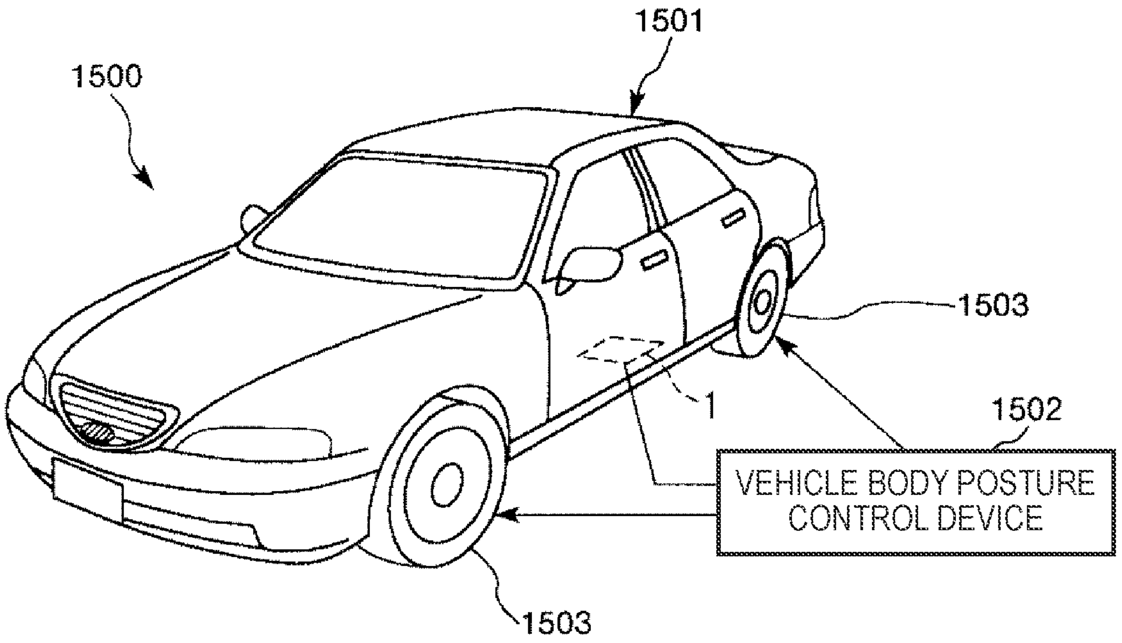
FIG. 18 is a perspective view illustrating a vehicle according to a tenth embodiment.

FIG. 18 is a perspective view illustrating the vehicle according to the tenth embodiment.

An automobile 1500 illustrated in FIG. 18 is an automobile to which the vehicle according to the invention is applied. In this figure, the automobile 1500 stores the physical quantity sensor 1 functioning as at least one (preferably a composite sensor capable of detecting both) of an acceleration sensor and an angular velocity sensor therein, and a posture of a vehicle body 1501 can be detected by the physical quantity sensor 1. A detection signal of the physical quantity sensor 1 is supplied to a vehicle body posture control device 1502 (posture control unit), and the vehicle body posture control device 1502 detects the posture of the vehicle body 1501, based on the signal, and hardness of a suspension can be controlled or brakes of individual wheels 1503 can be controlled according to the detection results. Here, for example, the same element as in the above-described embodiments can be used as the physical quantity sensor 1.

The automobile 1500 (vehicle) includes the physical quantity sensor 1 and a vehicle body posture control device 1502 (posture control unit). Accordingly, the effects of the physical quantity sensor 1 described above can be obtained, and a high reliability can be exerted.

In addition to this, the physical quantity sensor 1 can be widely applied to a car navigation system, a car air conditioner, an anti-lock braking system (ABS), an air bag, a tire pressure monitoring system (TPMS), an engine control, and an electronic control unit (ECU) such as a battery monitor of a hybrid vehicle or an electric vehicle.

In addition, the vehicle is not limited to the automobile 1500, and can also be applied to, for example, an airplane, a rocket, an artificial satellite, a ship, an automated guided vehicle (AGV), a biped walking robot, an unmanned airplane such as a drone, and the like.

As described above, although a physical quantity sensor, a physical quantity sensor device, an electronic apparatus, a portable electronic apparatus, and a vehicle according to the invention are described based on the illustrated embodiments, the invention is not limited to this, and configurations of each portion can be replaced with any configuration having the same function. In addition, any other configuration unit may be added to the invention. In addition, the above-described embodiments may be appropriately combined. For example, the elements 3, 4, 5, and 6 may have configurations different from each other, and a configuration according to another embodiment different from the first, second, third, and fourth embodiments described above may be adopted.

In addition, in the above-described embodiment, a case where acceleration is detected by a physical quantity sensor is described, but the invention is not limited to this, and, for example, an angular velocity may be detected. In addition, both the acceleration and the angular velocity may be detected.

What is claimed is:

1. A physical quantity sensor comprising:

three axes orthogonal to each other being defined as an X axis, a Y axis, and a Z axis;

a substrate that is rectangular-shaped, the substrate having a ledge at a periphery thereof, the ledge having first, second, third, and fourth sides, the first and second sides extending along the Y axis and being opposite to each other along the X axis, the third and fourth sides extending along the X axis and being opposite to each other along the Y axis, an area being surrounded by the ledge having a center point, the substrate having first, second, third, and fourth corners, the first corner connecting one end of each of the first and third sides, the second corner connecting one end of each of the second and fourth sides, the third corner connecting the other end of each the second and third sides, the fourth corner connecting the other end of each of the first and fourth sides, the first corner and the second corner being diagonally opposite to each other with respect to the center point, the X axis, and the Y axis;

a first sensor element configured to detect an acceleration along the X axis, the first sensor element being configured with:

a first fixing member fixed at a first area on the first side of the ledge;

a first fixing electrode having a first trunk extending along the X axis from the first fixing member and a first fixing electrode finger extending along the Y axis and branching out from the first trunk, the first fixing electrode facing a surface of the substrate along the Z axis via a gap;

a second fixing member fixed at the first area on the first side of the ledge;

a second fixing electrode having a second trunk extending along the X axis from the second fixing member and a second fixing electrode finger extending along the Y axis and branching out from the second trunk, the second fixing electrode facing the surface of the substrate along the Z axis via the gap;

a third fixing member fixed at the first area on the first side of the ledge;

a first spring having a first end connected to the third fixing member and a second end;

a first movable member connected to the second end of the first spring, the first movable member facing the surface of the substrate along the Z axis via the gap;

a first movable electrode finger extending along the Y axis and branching out from the first movable member, the first movable electrode finger facing the first fixing electrode finger along the X axis; and a second movable electrode finger extending along the Y axis and branching out from the first movable member, the second movable electrode finger facing the second fixing electrode finger along the X axis;

a second sensor element configured to detect an acceleration along the X axis, the second sensor element being configured with:

a fourth fixing member fixed at a second area on the second side of the ledge;

a third fixing electrode having a third trunk extending along the X axis from the fourth fixing member and a third fixing electrode finger extending along the Y axis and branching out from the third trunk, the third fixing electrode facing the surface of the substrate along the Z axis via the gap;

a fifth fixing member fixed at the second area on the second side of the ledge;

a fourth fixing electrode having a fourth trunk extending along the X axis from the fifth fixing member and a fourth fixing electrode finger extending along the Y axis and branching out from the fourth trunk, the fourth fixing electrode facing the surface of the substrate along the Z axis via the gap;

a sixth fixing member, fixed at the second area on the second side of the ledge;

a second spring having a third end connected to the sixth fixing member and a fourth end;

a second movable member connected to the fourth end of the second spring, the second movable member facing the surface of the substrate along the Z axis via the gap;

a third movable electrode finger extending along the Y axis and branching out from the second movable member, the third movable electrode finger facing the third fixing electrode finger along the X axis; and a fourth movable electrode finger extending along the Y axis and branching out from the second movable member, the fourth movable electrode finger facing the fourth fixing electrode finger along the X axis;

a third sensor element configured to detect an acceleration along the Y axis; and a fourth sensor element configured to detect an acceleration along the Y axis, wherein the first area on the first side of the ledge is located closer to the first corner than the fourth corner along the Y axis, the second area on the second side of the ledge is located closer to the second corner than the third corner along the Y axis, the first trunk is fixed only on the first fixing member, the second trunk is fixed only on the second fixing member, the first spring is fixed only on the third fixing member, the third trunk is fixed only on the fourth fixing member, the fourth trunk is fixed only on the fifth fixing member, and the second spring is fixed only on the sixth fixing member.

2. The physical quantity sensor according to claim 1, wherein, when an angular velocity around the Z axis is applied, a separation distance between the first movable electrode finger and the first fixing electrode finger and a separation distance between the second movable electrode finger and the second fixing electrode finger are separated from or approach each other, and a separation distance between the third movable electrode finger and the third fixing electrode finger and a separation distance between the fourth movable electrode finger and the fourth fixing electrode finger are separated from or approach each other.

3. A physical quantity sensor device comprising:

the physical quantity sensor according to claim 1; and a circuit element configured to receive a signal from the physical quantity sensor.

4. An electronic apparatus comprising:

the physical quantity sensor according to claim 1;

a control circuit configured to control driving of the physical quantity sensor; and a correction circuit configured to correct a physical quantity detected by the physical quantity sensor.

* * * * *